(12) United States Patent
Satoh et al.

(10) Patent No.: US 7,858,723 B2
(45) Date of Patent: Dec. 28, 2010

(54) ETHYLENE-BASED RESIN AND MOLDED OBJECT OBTAINED THEREFROM

(75) Inventors: Yasuo Satoh, Ichihara (JP); Hideki Bando, Ichihara (JP); Yoshiho Sonobe, Ichihara (JP); Masao Suzuki, Ichihara (JP); Daisuke Tanifuji, Hiroshima (JP); Chiaki Tomata, Takaishi (JP); Makoto Mitani, Yokohama (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 11/883,316

(22) PCT Filed: Jan. 31, 2006

(86) PCT No.: PCT/JP2006/301922

§ 371 (c)(1),
(2), (4) Date: Jul. 30, 2007

(87) PCT Pub. No.: WO2006/080578

PCT Pub. Date: Aug. 3, 2006

(65) Prior Publication Data

US 2008/0090983 A1   Apr. 17, 2008

(30) Foreign Application Priority Data

Jan. 31, 2005 (JP) .............................. 2005-024079
Jan. 31, 2005 (JP) .............................. 2005-024080

(51) Int. Cl.
*C08F 10/02* (2006.01)
*C08F 10/04* (2006.01)
*C08F 10/14* (2006.01)

(52) U.S. Cl. .................... 526/352; 526/348; 526/348.2; 526/348.6; 526/352.2

(58) Field of Classification Search .............. 526/348, 526/348.2, 348.6, 352, 352.2
See application file for complete search history.

(56) References Cited

U.S. PATENT DOCUMENTS

| | | | |
|---|---|---|---|
| 5,883,205 A | | 3/1999 | Tsutsui et al. |
| 6,359,073 B1 * | | 3/2002 | Babb et al. .................. 525/194 |
| 2002/0010077 A1 | | 1/2002 | Lue et al. |
| 2003/0120003 A1 | | 6/2003 | Kashiwa et al. |

FOREIGN PATENT DOCUMENTS

| | | |
|---|---|---|
| EP | 1241194 A1 | 9/2002 |
| JP | 2-276807 A | 11/1990 |
| JP | 4-213309 A | 8/1992 |
| JP | 6-65443 A | 3/1994 |
| JP | 7-26079 A | 1/1995 |
| JP | 7-304826 A | 11/1995 |
| JP | 8-311260 A | 11/1996 |
| JP | 2002-515521 A | 5/2002 |
| JP | 2005-248013 A | 9/2005 |
| WO | WO-93/008221 | 4/1993 |
| WO | WO-99/60032 A1 | 11/1999 |
| WO | WO-2004/104055 A1 | 12/2004 |

OTHER PUBLICATIONS

Dow Chemical Company, Affinity EG 8200G Product Data Sheet, Jun. 2009.*
Dow Chemical Company, Affinity PF 1140G Product Data Sheet, Jun. 2009.*
Kanai et al., Journal of The Society of Fibre Science and Technology, Japan, vol. 42, No. 1 (1986), pp. 31-41.

* cited by examiner

*Primary Examiner*—James Seidleck
*Assistant Examiner*—Richard A Huhn
(74) *Attorney, Agent, or Firm*—Birch, Stewart, Kolasch & Birch, LLP

(57) ABSTRACT

Ethylene-based resin, which exhibits a satisfactorily high melt tension and can provide a molded object excellent in mechanical strength, the ethylene-based resin characterized in simultaneously satisfying the requirements [1] to [5] described below:

[1] melt flow rate (MFR) under a loading of 2.16 kg at 190° C. is in the range of 0.1 to 100 g/10 minutes;

[2] density (d) is in the range of 875 to 970 kg/m$^3$;

[3] ratio [MT/$\eta$*(g/P)] of melt tension [MT(g)] at 190° C. to shearing viscosity [$\eta$*(P)] at 200° C. at an angular velocity of 1.0 rad/sec. is in the range of $1.50 \times 10^{-4}$ to $9.00 \times 10^{-4}$;

[4] sum [(A+B)/1000C)] of the number of methyl branches [A(/1000C)] and the number of ethyl branches [B(/1000C)] per 1000 carbon atoms measured by $^{13}$C-NMR is 1.8 or less; and

[5] zero shear viscosity [$\eta_0$(P)] at 200° C. and weight-average molecular weight (Mw) measured by GPC-viscosity detector method (GPC-VISCO) satisfy the following relational expression (Eq-1):

$$0.01 \times 10^{-13} \times Mw^{3.4} \leq \eta_0 \leq 4.5 \times 10^{-13} \times Mw^{3.4} \quad \text{(Eq-1)}.$$

4 Claims, 1 Drawing Sheet

ETHYLENE-BASED RESIN AND MOLDED OBJECT OBTAINED THEREFROM

TECHNICAL FIELD

The present invention relates to ethylene-based resins, which are superior to known ethylene-based resins in moldability and in mechanical strength, and to articles obtainable therefrom.

BACKGROUND ART

Ethylene-based resins are formed by various molding methods and used in various applications. Characteristics required of ethylene-based resins vary depending on their molding method and applications. For example, when a cast film is to be formed in T-die molding, there arises neck-in wherein the edge of the film is shrunk in a direction toward the center. When neck-in occurs, the film width is decreased and simultaneously the film edge becomes thicker than the film center, thus reducing the product yield. To minimize neck-in, an ethylene-based resin having a high melt tension for the molecular weight should be selected. This property is also necessary for preventing sagging or rupture in blow molding or for preventing bubble tremble or rupture in a process of inflation film.

Further, it is known that when a cast film is to be formed in T-die molding, regular variation in thickness occurring in the take-off direction of the film occurs, which is called "take-off surging", which may also be called "draw resonance." Take-off surging produces thickness variation in the film. As a result, the mechanical strength varies depending on the location. For this reason, in order to produce a film homogeneous in thickness stably, it is necessary to avoid the occurrence of take-off surging. In order to control the occurrence of take-off surging, it is believed that a resin property such that the rate of strain hardening of elongational viscosity increases as the rate of strain increases is required (for example, Toshitaka KANAI, Akira FUNAKI, Sen-i Gakkaishi (Journal of The Society of Fiber Science and Technology, Japan), 41, T-1 (1986)).

An already-known ethylene-based polymer obtained by using a metallocene catalyst is excellent in mechanical strength such as tensile strength, tear strength or impact resistance, but is inferior in melt tension, and thus exhibits significant neck-in. Further, take-off surging will be generated because the elongational viscosity does not show strain rate hardening property.

High pressure low-density polyethylene is superior in moldability regarding such as neck-in because it has a melt tension which is greater than that of an ethylene-based polymer obtained using a metallocene catalyst. Further, no take-off surging will be generated because the elongational viscosity shows strain rate hardening property. However, a high-pressure low-density polyethylene has a complicated long-chain branched structure, and thus is inferior in mechanical strength such as tensile strength, tear strength or impact strength.

As an ethylene-based polymer which maintains moldability regarding such as neck-in and take-off surging and has mechanical strength, a composition comprising an ethylene-based polymer obtained by using a metallocene catalyst and a high-pressure low-density polyethylene is proposed in, for example, Japanese Patent Applications Laid-Open No. H6-65443 and H7-26079, etc. When the content of high-pressure low-density polyethylene is high, however, the composition is expected to be inferior in mechanical strength such as tensile strength, tear strength or impact resistance. When the content of high-pressure low-density polyethylene is low, the composition does not sufficiently improve in melt tension, and is thus expected to exhibit deterioration in moldability, such as occurrence of significant neck-in.

To solve the problem, various ethylene-based polymers having long branches introduced into them by means of a metallocene catalyst have been disclosed. Japanese Patent Application Laid-Open No. H2-276807 discloses an ethylene-based polymer obtained by solution polymerization in the presence of a catalyst consisting of ethylene bis(indenyl) hafnium dichloride and methyl alumoxane, Japanese Patent Application Laid-Open No. H4-213309 discloses an ethylene-based polymer obtained by gaseous phase polymerization in the presence of a catalyst comprising ethylene bis (indenyl)zirconium dichloride and methyl alumoxane carried onsilica, WO93/08221 discloses an ethylene-based polymer obtained by solution polymerization in the presence of a constraint geometrical catalyst, Japanese Patent Application Laid-Open No. 8-311260 discloses an ethylene-based polymer obtained by gaseous phase polymerization in the presence of a catalyst comprising a racemate and mesoisomer of $Me_2Si(2\text{-Me-Ind})_2$ carried on silica and methyl alumoxane. It is described that these ethylene-based polymers, as compared with long branch-free linear ethylene-based polymers, are excellent in moldability with improvement in melt tension, but neck-in is still significant so improvement in moldability is expected to be insufficient. Unlike high-pressure low-densitypolyethylene, such ethylene-based polymers do not show strain rate hardening property with respect to elongational viscosity. Therefore, improvement in take-off surging cannot be expected.

As described above, it was difficult to effectively obtain ethylene-based resin excellent in moldability, e.g. regarding neck-in and take-off surging, and mechanical strength by using conventional technologies.

The present inventors have made extensive study in view of these circumstances, and as a result, we have found that an ethylene-based polymer which generates less neck-in in T-die molding and no take-off surging and which is excellent in mechanical strength is obtained by imparting a specific molecular structure and melt physical properties thereto, and the present invention has been thereby completed.

DISCLOSURE OF THE INVENTION

The ethylene-based resin of the present invention is characterized in simultaneously satisfying the requirements [1] to [5] described below:

[1] melt flow rate (MFR) under a loading of 2.16 kg at 190° C. is in the range of 0.1 to 100 g/10 minutes;

[2] density (d) is in the range of 875 to 970 kg/m$^3$;

[3] ratio [MT/η*(g/P)] of melt tension [MT(g)] at 190° C. to shear viscosity [η*(P)] at 200° C. at an angular velocity of 1.0 rad/sec. is in the range of $1.50 \times 10^{-4}$ to $9.00 \times 10^{-4}$;

[4] sum[(A+B) (/1000C)] of the number of methyl branches [A(/1000C)] and the number of ethyl branches [B(/1000C)] per 1000 carbon atoms measured by $^{13}$C-NMR is 1.8 or less; and

[5] zero shearing viscosity [η$_0$(P)] at 200° C. and weight-average molecular weight (Mw) measured by GPC-viscosity detector method (GPC-VISCO) satisfy the following relational expression (Eq-1):

$$0.01 \times 10^{-13} \times Mw^{3.4} \leq \eta_0 \leq 4.5 \times 10^{-13} \times Mw^{3.4} \quad \text{(Eq-1)}.$$

One aspect of the ethylene-based resin of the present invention is an ethylene-based resin which is obtained by copolymerizing ethylene and an α-olefin having 4 to 10 carbon atoms and which satisfies the above-mentioned requirements [1] to [5] simultaneously.

Further, the present invention relates to a molded object, preferably a film, obtained from the ethylene-based polymer described above.

BEST MODE FOR CARRYING OUT THE INVENTION

Figure 1:
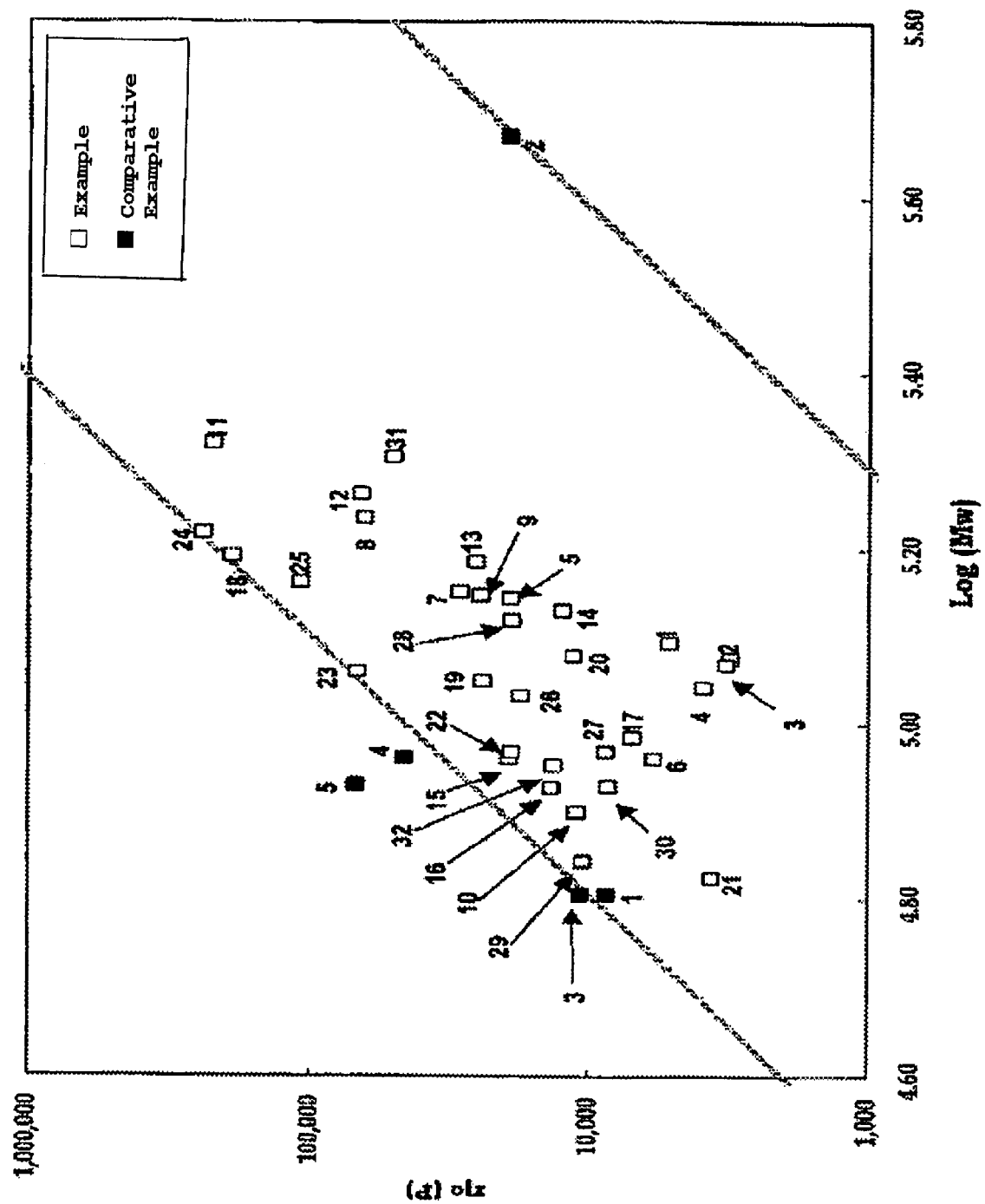
FIG. 1 is a graph in which weight-average molecular weights (Mw) and zero shear viscosities ($\eta_0$) of the ethylene-based resins disclosed in Examples and Comparative Examples are plotted. In the graph, open squares represent Examples and filled squares represent Comparative Examples. Each number in the graph is an Example number or a Comparative Example number. The two straight lines in the graph are boundary lines, which show the upper and lower limits of the formula using parameters.

Hereinafter, the ethylene-based polymers [R] of the present invention are specifically described.

Although the ethylene-based resin [R] of the present invention may consist of either a single kind of ethylene-based polymer or two or more kinds of ethylene-based polymers, it is characterized by necessarily satisfying all the requirements [1] to [5]. When the ethylene-based resin [R] of the present invention consists of a single kind of ethylene-based polymer, the ethylene-based polymer [R1] is efficiently produced by the polymerization method mentioned later. When the ethylene-based resin [R] of the present invention consists of two or more kinds of ethylene-based polymers, it preferably includes the aforesaid ethylene-based polymer [R1]. Examples of the ethylene-based polymer(s) [R2] other than the ethylene-based polymer [R1] include copolymers of ethylene and an α-olefin having 4 to 10 carbon atoms, which are obtained by use of a metallocene catalyst or a Ziegler catalyst, and high-pressure low-density polyethylene, which is produced by the high-pressure radical polymerization method. When it consists of two or more kinds of ethylene-based polymers, the composition ratio of the ethylene-based polymer [R1] to the ethylene-based polymer(s) [R2] and the kind(s) of the ethylene-based polymer(s) [R2] are not particularly limited if the [R1] and the [R2] can be blended and the blended resin satisfies the requirements [1] to [5] simultaneously. However, in use for industrial applications mentioned later, the composition ratio of the ethylene-based polymer [R1] in the ethylene-based resin [R] is usually set to 99% by weight or less, preferably 70% by weight or less, and more preferably 30% by weight or less. The ethylene-based resin [R] of the present invention is usually constituted only of the ethylene-based polymer [R1] from the viewpoint that treatment steps such as blending can be omitted. On the other hand, when one wants to promote characteristic performance of the ethylene-based polymer [R1] more noticeably, or when one wish to add a new performance, which the ethylene-based polymer [R1] does not have inherently, [R1] is used together with the aforementioned ethylene-based polymer [R2] together in a blend form.

The ethylene-based resin [R] of the present invention is characterized in simultaneously satisfying the requirements [1] to [5] described above. Hereinafter, these requirements [1] to [5] are described concretely.

Requirement [1]

The melt flow rate (MFR) of the ethylene-based resin [R] of the present invention at 190° C. under a loading of 2.16 kg is in the range of 0.1 to 100 g/10 minutes, preferably 1.0 to 50 g/10 minutes, more preferably 4.0 to 30 g/10 minutes. When the MFR is 1.0 g/10 minutes or more, the shear viscosity of the ethylene-based resin is not too high and is excellent in moldability and results in good appearance, for example, when it is molded into a film. When the MFR is 100 g/10 minutes or lower, the ethylene-based resin is excellent in tensile strength and heat seal strength. The MFR is a value measured under the conditions of 190° C. and 2.16 kg loading according to ASTM D1238-89.

Generally, the MFR depends strongly on the molecular weight. That is, the smaller the MFR, the larger the molecular weight; whereas the greater the MFR, the smaller the molecular weight. It is known that the molecular weight of the ethylene-based resin [R] of the present invention is determined by the compositional ratio of hydrogen to ethylene (hydrogen/ethylene) in the polymerization system during the production of the ethylene-based polymer constituting the resin (for example, Kazuo Soga, KODANSHA "CATALYTIC OLEFIN POLYMERIZATION", p. 376 (1990)). Accordingly, hydrogen/ethylene is increased or decreased, whereby an ethylene-based resin [R] having an MFR within the range from the upper limit to the lower limit in the claims can be produced.

Requirement [2]

The density (d) of the ethylene-based resin [R] of the present invention is within the range of 875 to 970 kg/m$^3$, preferably 885 to 964 kg/m$^3$, more preferably 905 to 960 kg/m$^3$. The density (d) which relates to the present invention is a value obtained by thermally treating a measurement sample at 120° C. for 1 hour, then gradually cooling it linearly to room temperature over 1 hour and measuring its density in a density gradient tube.

When the density (d) is 875 kg/m$^3$ or more, the ethylene-based resin has good heat resistance and the surface of a film produced from the ethylene-based resin is less sticky. On the other hand, when the density (d) is 970 kg/m$^3$ or less, the ethylene-based resin has a good low-temperature sealing property.

Generally, the density depends on the content of α-olefin in the ethylene-based polymer, and as the content of α-olefin is decreased, the density is increased, while the content of α-olefin is increased, the density is decreased. It is known that the content of α-olefin in the ethylene-based polymer is determined by the compositional ratio of α-olefin to ethylene (α-olefin/ethylene) in the polymerization system (for example, Walter Kaminsky, Makromol. Chem., 193, p. 606 (1992)). For this reason, in the production of the ethylene-based polymer constituting the ethylene-based resin [R] of the present invention, it is possible to control the density of the polymer by increasing or decreasing α-olefin/ethylene. By such a controlling method, it is possible to make the density of the ethylene-based resin [R] of the present invention satisfy the range of from the lower limit to the upper limit of the claims.

Requirement [3]

The ratio [MT/$\eta^*$(g/P)] of the melt tension [MT(g)] at 190° C. to the shear viscosity [$\eta^*$(P)] at 200° C. at an angular velocity of 1.0 rad/sec of the ethylene-based resin [R] of the present invention is in the range of $1.50 \times 10^{-4}$ to $9.00 \times 10^{-4}$, preferably $2.00 \times 10^{-4}$ to $7.00 \times 10^{-4}$, more preferably $2.60 \times 10^{-4}$ to $5.00 \times 10^{-4}$. An ethylene-based resin having an MT/$\eta^*$ of $1.50 \times 10^{-4}$ or more exhibits good result regarding neck-in.

Production under the conditions described in Example 31 provided later can yield an ethylene-based polymer having an MT/η* near the lower limit of claims, whereas production under the conditions described in Example 19 can yield an ethylene-based polymer having an MT/η* near the upper limit of claims.

In the present invention, the melt tension (MT) was determined by measuring the stress upon stretching a molten polymer at a constant speed. In this measurement, an MT measuring machine manufactured by Toyo Seiki Seisaku-sho, Ltd. was used. The measurement conditions include a resin temperature of 190° C., a melting time of 6 minutes, a barrel diameter of 9.55 mmφ, an extrusion speed of 15 mm/min., a take-up speed of 24 m/min (when a molten filament breaks, the take-up speed is reduced by 5 m/min.), a nozzle diameter of 2.095 mmφ, and a nozzle length of 8 mm.

The shear viscosity (*η) at 200° C. at an angular velocity of 1.0 rad/sec was determined by measuring the angular velocity [ω(rad/sec)] dispersion of shear viscosity (*η) at a measurement temperature of 200° C. in the range of $0.02512 \leq \omega \leq 100$. In this measurement, a dynamic stress rheometer SR-5000 manufactured by Rheometrix was used. As a sample holder, a 25 mmφ parallel plate was used, and the sample thickness was about 2.0 mm. 5 points were measured per digit of ω. Distortion was selected suitably in the range of 3 to 10%, which is not to be over torque and could be detected in the measurement range. The sample used in measurement of shear viscosity was prepared by press-molding the measurement sample to a thickness of 2 mm under the conditions of a preheating temperature of 190° C., a preheating time of 5 minutes, a heating temperature of 190° C., a heating time of 2 minutes, a heating pressure of 100 kg/cm², a cooling temperature of 20° C., a cooling time of 5 minutes and a cooling pressure of 100 kg/cm² with a press molding machine manufactured by Shinto Metal Industries, Ltd.

Requirement [4]

The sum [(A+B)(/1000C)] of the number of methyl branches [A(/1000C)] and the number of ethyl branches [B(/1000C)] of the ethylene-based resin [R] of the present invention measured by $^{13}$C-NMR is 1.8 or less, preferably 1.3 or less, more preferably 0.8 or less, and particularly preferably 0.5 or less. The number of methyl branches and the number of ethyl branches defined in the present invention is defined in terms of number per 1,000 carbons as defined later.

It is known that when short branches such as methyl branches, ethyl branches etc. exist in the ethylene-based resin, the short branches are incorporated into crystals to broaden the spacing of the crystal planes, thus lowering the mechanical strength of the resin (for example, Zenjiro Ohsawa et al.: Kobunshi No Jyumyoyosoku To Chojyumyoka Gijyutsu (Estimation of Longevity of Polymer and Techniques of Prolonging Longevity), p. 481, N.T.S (2002)). Accordingly, when the sum (A+B) of the number of methyl branches and the number of ethyl branches is 1.8 or less, the resulting ethylene-based resin is excellent in mechanical strength.

The number of methyl branches and the number of ethyl branches in an ethylene-based resin depend highly on the method of polymerizing the ethylene-based polymer constituting the ethylene-based resin, and an ethylene-based polymer obtained by high-pressure radical polymerization has more methyl and ethyl branches than those in an ethylene-based polymer obtained by coordination polymerization using a Ziegler catalyst system. In the coordination polymerization, the number of methyl branches and the number of ethyl branches in the ethylene-based polymer depend highly on the compositional ratio among propylene, 1-butene and ethylene (propylene/ethylene, 1-butene/ethylene) in the polymerization system. Accordingly, 1-butene/ethylene is increased or decreased to produce an ethylene-based resin having the sum (A+B) of the number of methyl branches and the number of ethyl branches, which is in the range of the claims.

The number of methyl branches and the number of ethyl branches measured by $^{13}$C-NMR are determined as follows. The measurement was conducted with an integration frequency of 10,000 to 30,000 by using ECP500 nuclear magnetic resonance apparatus (1H: 500 MHz) manufactured by JEOL Ltd. As a chemical shift standard, a peak (29.97 ppm) of main-chain methylene was used. 250 to 400 mg of sample and 3 ml mixture consisting of o-dichlorobenzene (special grade, manufactured by Wako Pure Chemical Industries, Ltd.) and benzene-d$_6$ (manufactured by ISOTEC) in the 5:1 ratio (ratio by volume) were introduced into a commercially available quartz glass tube of 10 mm in diameter for NMR measurement, then heated at 120° C. and dispersed uniformly. Spectral assignment of each absorption in an NMR spectrum was conducted according to Kagaku no Ryoiki (Chemical Field), extra issue 141, NMR-General Remarks and Experimental Guide [I], pages 132 to 133. The number of methyl branches per 1,000 carbons was calculated from the integrated intensity ratio of the absorption (19.9 ppm) of methyl groups derived from methyl branches to the total integration of absorption observed in the range of 5 to 45 ppm. The number of ethyl branches was calculated from the integrated intensity ratio of the absorption (10.8 ppm) of ethyl groups derived from ethyl branches to the total integration of absorption observed in the range of 5 to 45 ppm.

Requirement [5]

The zero shear viscosity [$\eta_0$(P)] at 200° C. and the weight-average molecular weight (Mw) measured by GPC-viscosity detector method (GPC-VISCO) of the ethylene-based resin [R] of the present invention satisfy the following relational expression (Eq-1):

$$0.01 \times 10^{-13} \times Mw^{3.4} \leq \eta_0 \leq 4.5 \times 10^{-13} \times Mw^{3.4} \quad \text{(Eq-1)}$$

Preferably, the following relational expression (Eq-2) is satisfied:

$$0.05 \times 10^{-13} \times Mw^{3.4} \leq \eta_0 \leq 4.5 \times 10^{-13} \times Mw^{3.4} \quad \text{(Eq-2)}$$

More preferably, the following relational expression (Eq-3) is satisfied:

$$0.10 \times 10^{-13} \times Mw^{3.4} \leq \eta_0 \leq 3.5 \times 10^{-13} \times Mw^{3.4} \quad \text{(Eq-3)}$$

Particularly preferably, the following relational expression (Eq-4) is satisfied:

$$0.15 \times 10^{-13} \times Mw^{3.4} \leq \eta_0 \leq 1.8 \times 10^{-13} \times Mw^{3.4} \quad \text{(Eq-4)}$$

It is known that when the zero shear viscosity, [$\eta_0$(P)] is log-log plotted with respect to the weight average molecular weight (Mw), a resin whose elongational viscosity does not show a strain hardening property, like linear ethylene-based polymers having no long-chain branches, follows the power law with a slope of 3.4, whereas a resin whose elongational viscosity shows a strain rate hardening property, like high-pressure low-density polyethylene, shows a zero shear viscosity [$\eta_0$(P)] lower than the power law (C. Gabriel, H. Munstedt, J. Rheol., 47(3), 619 (2003)). When the zero shear viscosity [$\eta_0$(P)] at 200° C. is $4.5 \times 10^{-13} \times Mw^{3.4}$ or less, the elongational viscosity of the resulting ethylene-based polymer exhibits strain rate hardening property. Therefore, take-off surging does not occur.

That the ethylene-based resin [R] of the present invention satisfies the above-mentioned relational expression (Eq-1)

means that log($\eta_0$) and log Mw are present in the area defined by the following relational expression (Eq-1') when the $\eta_0$ and Mw of ethylene-based resin [R1] are log-log plotted.

$$3.4 \text{ Log(Mw)}-15.0000 \leq \text{Log}(\eta_0) \leq 3.4 \text{ Log(Mw)}-12.3468 \quad \text{(Eq-1')}$$

FIG. 1 is a diagram in which log($\eta_0$) and log Mw are plotted for all the ethylene-based resins described in Example according to the present invention. By producing under the conditions described in Example 2, it is possible to obtain an ethylene-based resin in which the relationship between the zero shear viscosity [$\eta_0$(P)] and the weight average molecular weight (Mw) defined by the above-mentioned parameter inequality expression (Eq-1) is close to the boundary line defined by the following formula (Eq-1") included in parameter inequality expressions (Eq-1'). On the other hand, by producing under the conditions described in Example 29, it is possible to obtain an ethylene-based resin which is close to the boundary line defined by the following formula (Eq-1''') included in parameter inequality expressions (Eq-1').

$$\text{Log}(\eta_0)=3.4 \text{ Log(Mw)}-15.0000 \quad \text{(Eq-1")}$$

$$\text{Log}(\eta_0)=3.4 \text{ Log(Mw)}-12.3468 \quad \text{(Eq-1''')}$$

The zero shear viscosity [$\eta_0$(P)] at 200° C. was determined in the following manner. A dispersion of angular velocity [$\omega$(rad/second)] of shear viscosity ($\eta^*$) at a measurement temperature of 200° C. is measured within the range of $0.02512 \leq \omega \leq 100$. In this measurement, a dynamic stress rheometer SR-5000 manufactured by Rheometrix was used. As a sample holder, a 25 mm$\phi$ parallel plate was used, and the sample thickness was about 2.0 mm. 5 points were measured per digit of $\omega$. Distortion was selected suitably in the range of 3 to 10%, which is not to be over torque and could be detected in the measurement range. The measurement sample was press-molded to a thickness of 2 mm to prepare the sample used in measurement of shear viscosity under the conditions of a preheating temperature of 190° C., a preheating time of 5 minutes, a heating temperature of 190° C., a heating time of 2 minutes, a heating pressure of 100 kg/cm², a cooling temperature of 20° C., a cooling time of 5 minutes and a cooling pressure of 100 kg/cm² with a press molding machine manufactured by Shinto Metal Industries, Ltd.

The zero shear viscosity $\eta_0$ was calculated by fitting the Carreau model of expression (Eq-5) given below to the actually measured rheology curve [a dispersion of angular velocity ($\omega$) of shear viscosity ($\eta^*$)] by the nonlinear least square method.

$$\eta^* = \eta_0[1+(\lambda\omega)^a]^{(n-1)/a} \quad \text{(Eq-5)}$$

In expression (Eq-5), $\lambda$ is a parameter having a dimension of time, and n represents the power law index of the material. The fitting by the nonlinear least square method is performed so that d in the following expression (Eq-6) may become the minimum.

$$d = \sum_{\omega=0.02512}^{100} [\text{Log}_{10}\eta_{exp}(\omega) - \text{Log}_{10}\eta_{calc}(\omega)]^2 \quad \text{(Eq-6)}$$

In the formula (Eq-6), $\eta_{exp}(\omega)$ and $\eta_{calc}(\omega)$ represent a shear viscosity actually measured and a shearing viscosity calculated from a Carreau model, respectively.

The weight average molecular weight (Mw) by the GPC-VISCO method was measured in the following manner by using GPC/V2000 manufactured by Waters. As a guard column, a Shodex AT-G was used and two AT-806 columns were used as analyzing columns. The column temperature was 145° C. o-Dichlorobenzene was used as the mobile phase and transferred at 1.0 ml/min. with 0.3 wt % of BHT as an antioxidant. The concentration of a sample was 0.1 wt %. A differential refractometer and a three-capillary viscometer were used as detectors. As standard polystyrene, products of Tosoh Corporation were used. Regarding molecular weight calculation, an actually measured viscosity was determined using a viscometer and a refractometer, and a weight average molecular weight (Mw) was calculated by actually measuring universal calibration.

The ethylene-based resin [R] of the present invention fully exerts the effects described below in most applications in the plastic industry as long as it satisfies the requirements [1] to [5]. From the standpoint of certain prevention of unexpected defects in moldability or fluidity, it is preferable to satisfy also the following requirement [6] in addition to the aforementioned requirements [1] to [5].

Requirement [6]

The intrinsic viscosity ([$\eta$] (dl/g)) measured in decalin at 135° C. and the weight average molecular weight Mw measured by GPC-viscosity detector method (GPC-VISCO) of the ethylene-based resin [R] of the present invention satisfy the following relational expression (Eq-7):

$$0.80\times10^{-4}\times Mw^{0.776} \leq [\eta] \leq 1.65\times10^{-4}\times Mw^{0.776} \quad \text{(Eq-7)}$$

More preferably, the following relational expression (Eq-8) is satisfied:

$$0.90\times10^{-4}\times Mw^{0.776} \leq [\eta] \leq 1.55\times10^{-4}\times Mw^{0.776} \quad \text{(Eq-8)}$$

Particularly preferably, the following relational expression (Eq-9) is satisfied:

$$0.90\times10^{-4}\times Mw^{0.776} \leq [\eta] \leq 1.40\times10^{-4}\times Mw^{0.776} \quad \text{(Eq-9)}$$

It is known that when a long chain branch is introduced into an ethylene-based polymer, it will exhibit a low intrinsic viscosity [$\eta$] (dl/g) for its molecular weight in comparison to linear ethylene-based polymers with no long chain branches (for example, Walther Burchard, ADVANCES IN POLYMER SCIENCE, 143, Branched Polymer II, p. 137 (1999)). Therefore, also in the ethylene-based resin [R] of the present invention, when the intrinsic viscosity [$\eta$] (dl/g) is $1.65\times10^{-4}\times Mw^{0.776}$ or less, the resin is excellent in moldability and fluidity because it has many long chain branches.

By producing under the conditions described in Example 31 described later, it is possible to obtain an ethylene-based polymer which is close to the boundary line defined by $0.80\times10^{-4}\times Mw^{0.776}=[\eta]$, which is included in the area defined by the parameter formula (Eq-7) which defines the relationship between intrinsic viscosity ([$\eta$] (dl/g)) and weight average molecular weight (Mw). On the other hand, by producing under the conditions described in Example 21, it is possible to obtain an ethylene-based polymer which is close to the boundary line defined by [$\eta$]=$1.65\times10^{-4}\times Mw^{0.776}$, included in the area defined parameter formula (Eq-7).

The intrinsic viscosity [$\eta$] (dl/g) was measured using a decalin solvent in the following manner. About 20 mg of a sample is dissolved in 15 ml of decalin and a specific viscosity $\eta_{sp}$ is measured in an oil bath at 135° C. This decalin solution is diluted with additional 5 ml of decalin solvent, and then specific viscosity $\eta_{sp}$ is measured in the same manner as above. This diluting procedure was repeated further twice, and the value of $\eta_{sp}/C$ upon extrapolation of concentration (C) to 0 was determined as the intrinsic viscosity [$\eta$]. (See the following equation (Eq-10).)

$$[\eta]=\lim(\eta_{sp}/C)(C\to0) \quad \text{(Eq-10)}$$

The ethylene-based resin [R] of the present invention may be comprised only of an ethylene-based polymer [R1], which is an essential constituent, or alternatively as described previously, an ethylene-based polymer [R] may be present together as long as the ethylene-based resin [R2] satisfies the aforementioned requirements [1] through [5] simultaneously. The method for the production of the ethylene-based polymer [R1], which is an essential constituent in the ethylene-based resin [R] of the present invention, is described in detail below.

The ethylene-based polymer [R1] according to the present invention can be produced efficiently by polymerizing ethylene and an α-olefin having 4 to 10 carbon atoms in the presence of a particulate catalyst component [in the following description, this catalyst component may be called "solid catalyst component (K)"] obtained from (S) a solid carrier, (A) at least one compound selected from (a-1) metallocene compounds of Group 4 in the periodic table represented by the following general formula (I) and (a-2) compounds of transition metals of Group 4 in the periodic table represented by the following general formula (II), (B) metallocene compound of Group 4 in the periodic table represented by the following general formula (III), (C) at least one compound selected from the group consisting of:

(c-1) an organometallic compound, (c-2) an organoaluminum oxy compound, and (c-3) a compound which reacts with component (A) and component (B) to form an ion pair, and, as necessary, (D) an organoaluminum compound.

Although the contact order of the above-mentioned components in the preparation of solid catalyst component (K) is described later, the following method [α] and method [b] are preferably used in normal cases from the viewpoint of convenience in contact treatment operations:

[a] a method which comprises mixing and contacting component (S) and component (C) together, followed by contacting a mixed component of components (A) and (B) to prepare solid catalyst component (K),

[b] a method which comprises mixing and contacting component (S) and component (C) together, followed by mixing and contacting component (A) to prepare solid catalyst component (K-1), separately mixing and contacting component (S) and component (C), followed by mixing and contacting component (B) to prepare solid catalyst component (K-2), and blending the solid catalyst component (K-1) and the solid catalyst component (K-2) to prepare solid catalyst component (K).

The example of α-olefins having 4 to 10 carbon atoms may include 1-butene, 1-hexene, 4-methyl-1-pentene, 1-octene and 1-decene, preferably α-olefins having 6 to 10 carbon atoms, and more preferably 1-hexene. As the α-olefin having 4 to 10 carbon atoms, two or more species may be used. When 1-butene is used as an α-olefin, an α-olefin having 6 to 10 carbon atoms is preferably used together.

Next, components (A), (B), (C) and (D) are described concretely.

Component (A) is comprised only of compound (a-1) or only of compound (a-2), or alternatively is comprised of both components, compound (a-1) and compound (a-2).

The metallocene compound (a-1) is a metallocene compound of Group 4 in the periodic table represented by the following general formula (I):

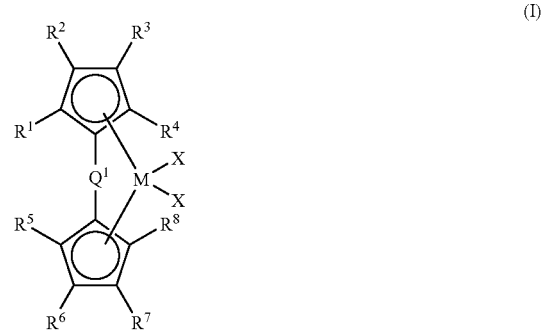

In the general formula (I), $R^1$ to $R^8$ are groups selected from the group consisting of hydrogen atom and hydrocarbon groups having 1 to 20 carbon atom(s) (alkyl groups, cycloalkyl groups, alkenyl groups, aryl groups and arylalkyl groups) and may be the same or different. $Q^1$ is an alkylene or alkylidene group or a silicon-containing group having 1 to 20 carbon atom(s). X's are each independently a group selected from a hydrogen atom, a halogen atom, a hydrocarbon group having 1 to 20 carbon atom(s), a halogen-containing hydrocarbon group having 1 to 20 carbon atom(s), a silicon-containing group, an oxygen-containing group, a sulfur-containing group, a nitrogen-containing group and a phosphorus-containing group. M is titanium, zirconium or hafnium.

As a preferable metallocene compound (a-1), a metallocene compound bridged with a dimethylsilylene group is selected. As a particularly preferable compound, dimethylsilylene bis(cyclopentadienyl)zirconium dichloride, dimethylsilylene bis(2-methylcyclopentadienyl)zirconium dichloride, dimethylsilylene bis(3-methylcyclopentadienyl)zirconium dichloride, dimethylsilylene bis(2-n-butylcyclopentadienyl)zirconium dichloride, or dimethylsilylene bis(3-n-butylcyclopentadienyl)zirconium dichloride is selected. The compound (a-1) used in Examples of this application described later is a compound represented by the following formula (A-1) or (A-2). In the present invention, however, compound (a-1) is not limited to these two compounds.

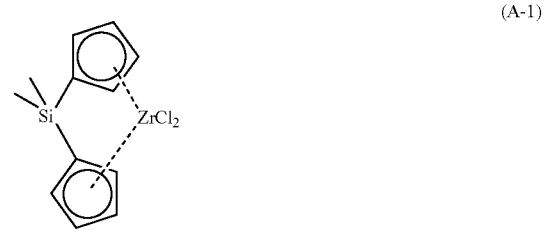

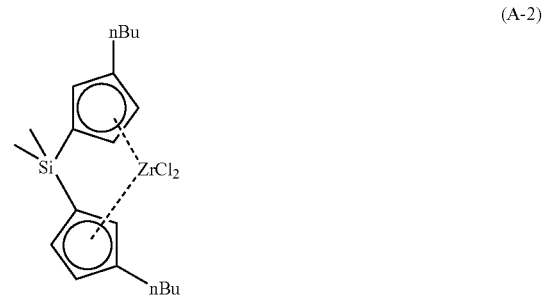

The metallocene compound (a-2) is a transition metal compound of Group 4 in the periodic table represented by the following general formula (II):

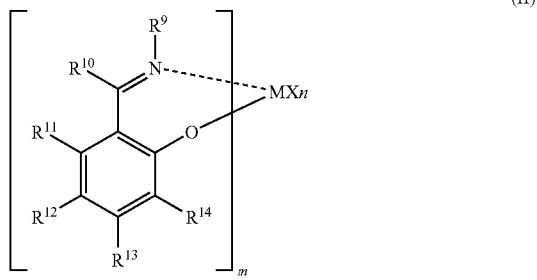

In the general formula (II), M represents a transition metal atom of Group 4 in the periodic table and m represents an integer of 1 to 4. $R^9$ is represented by the following general formula (II-1) or (II-2). $R^{10}$ to $R^{14}$ may be the same or different and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of these groups may be bonded to one another to form a ring. When m is 2, two of the groups represented by the $R^{10}$ to $R^{14}$ may be bonded to each other, provided that $R^9$'s shall not be bonded to each other, n is a number which satisfies the valence of M. X represents, in each occurrence, a group selected from a hydrogen atom, a halogen atom, a hydrocarbon group having 1 to 20 carbon atom(s), a halogen-containing hydrocarbon group having 1 to 20 carbon atom(s), a silicon-containing group, an oxygen-containing group, a sulfur-containing group, a nitrogen-containing group and a phosphorus-containing group, and when n is 2 or more, a plurality of groups represented by X's may be the same or different, and a plurality of groups represented by X's may be bonded to one another to form a ring.

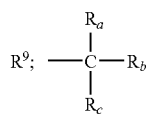

Wherein Ra represents a hydrogen atom, an aliphatic hydrocarbon group or an alicyclic hydrocarbon group, and Rb and Rc each represent a hydrogen atom or a methyl group and may be the same or different;

wherein the broken line indicates that two $C_\beta$'s are bonded directly to each other, or two $C_\beta$'s are bound to each other via a hydrocarbon group having one or more carbon atom(s).

Among transition metal compounds (a-2), compounds in which $R^9$ in the general formula (II) is methyl, ethyl, n-propyl, n-hexyl, n-octadecyl, cyclohexyl, cycloheptyl, cyclooctyl, 4-tert-butylcyclohexyl, methylenecyclohexyl, isopropyl, 1-methylhexyl or 1,5-dimethylhexyl are preferably used. The compound (a-2) used in Examples of this application described later is a compound represented by the following formula (A-3). In the present invention, however, compound (a-2) is not limited to this compound.

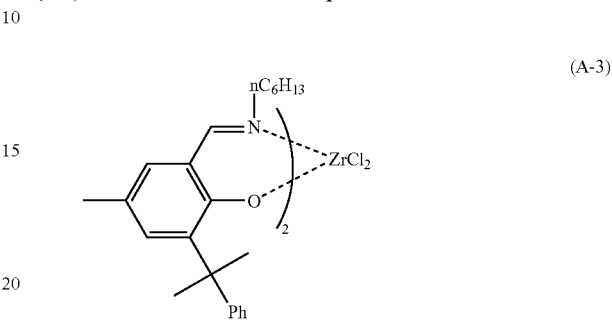

The component (B) is a metallocene compound of Group 4 in the periodic table represented by the following general formula (III):

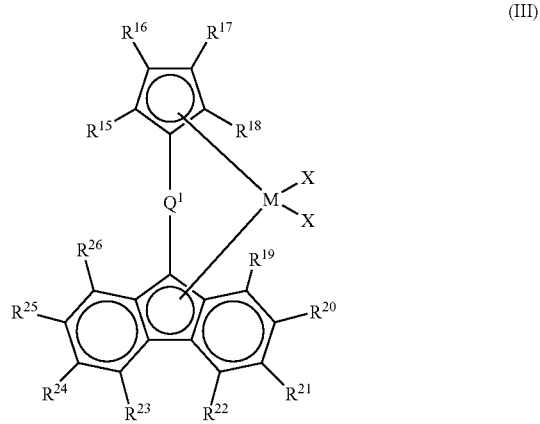

In the general formula (III), $R^9$ to $R^{20}$ may be the same or different and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, and two or more of these groups may be bonded to one another to form a ring. $Q^2$ is a divalent group binding two ligands, and is a hydrocarbon group having 1 to 20 carbon atom(s), a halogen-containing hydrocarbon group having 1 to 20 carbon atom(s), a silicon-containing group or a germanium- or tin-containing group, X's are each independently a group selected from a hydrogen atom, a halogen atom, a hydrocarbon group having 1 to 20 carbon atom(s), a halogen-containing hydrocarbon group having 1 to 20 carbon atom(s), a silicon-containing group, an oxygen-containing group, a sulfur-containing group, a nitrogen-containing group and a phosphorus-containing group. M is a transition metal selected from titanium, zirconium and hafnium.

Among these, preferable components (B) include isopropylidene(cyclopentadienyl)(fluorenyl)zirconium dichloride, isopropylidene(cyclopentadienyl)(2,7-di-tert-butylfluorenyl)zirconium dichloride, isopropylidene(cyclopentadienyl))3,6-di-tert-butylfluorenyl)zirconium dichloride, isopropylidene(cyclopentadienyl)(octamethyloctahydridedibenzfluorenyl)zirconium dichloride, cyclohexylidene(cyclopentadienyl)(fluorenyl)zirconium dichloride, cyclohexylidene(cyclopentadienyl)(2,7-di-tert-butylfluorenyl)zirconium dichloride, cyclohexylidene(cyclopentadienyl)(3,6-di-tert-butylfluorenyl) zirconium dichloride, cyclohexylidene(cyclopentadienyl)(octamethyloctahydridedibenzfluorenyl)zirconium dichloride, dimethylsilyl(cyclopentadienyl)(fluorenyl)zirconium dichloride, dimethylsilyl(cyclopentadienyl)(2,7-di-tert-butylfluorenyl)zirconium dichloride, dimethylsilyl(cyclopentadienyl)(3,6-di-tert-butylfluorenyl)zirconium dichloride, dimethylsilyl(cyclopentadienyl)(octamethyloctahydridedibenzfluorenyl)zirconium dichloride, isopropylidene(indenyl)(fluorenyl)zirconium dichloride, isopropylidene(indenyl)(2,7-di-tert-butylfluorenyl)zirconium dichloride, isopropylidene(indenyl)(3,6-di-tert-butylfluorenyl)zirconium dichloride, isopropylidene(indenyl)(octamethyloctahydridedibenzfluorenyl)zirconium dichloride, cyclohexylidene(indenyl)(fluorenyl)zirconium dichloride, cyclohexylidene(indenyl)(2,7-di-tert-butylfluorenyl)zirconium dichloride, cyclohexylidene(indenyl)(3,6-di-tert-butylfluorenyl)zirconium dichloride, cyclohexylidene(indenyl)(octamethyloctahydridedibenzfluorenyl)zirconium dichloride, dimethylsilyl(indenyl)(fluorenyl)zirconium dichloride, dimethylsilyl(indenyl)(2,7-di-tert-butylfluorenyl)zirconium dichloride, dimethylsilyl(indenyl)(3,6-di-tert-butylfluorenyl)zirconium dichloride, and dimethylsilyl(indenyl)(octamethyloctahydridedibenzfluorenyl)zirconium dichloride. The compound (B) used in Examples of this application described later is a compound represented by the following formula (B-1) or (B-2). In the present invention, however, compound (a-1) is not limited to these two compounds.

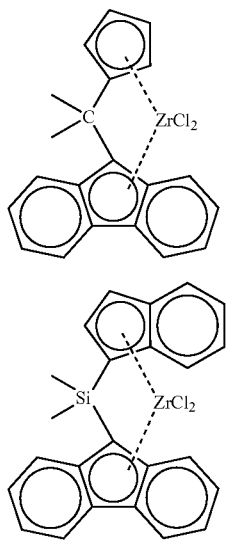

(B-1)

(B-2)

Component (C) is at least one compound selected from (c-1) an organometallic compound, (c-2) an organoaluminum oxy compound and (c-3) a compound which reacts with component (A) and component (B) to form anion pair. As such compounds, the compounds described in Japanese Patent Application Laid-Open No. H11-315109 and EP0874005A1, both of which were filed by the present applicant, can be used without limitation. Preferred aspects are provided below.

The organometallic compound (c-1) is preferably an organoaluminum compound, and is used alone or as a mixture of two or more kinds of the compound.

The organoaluminum oxy compound (c-2) is preferably an organoaluminium oxy compound prepared from trialkyl aluminum or tricycloalkyl aluminum, more preferably an organoaluminum oxy compound prepared from trimethyl aluminum or triisobutyl aluminum. Such organoaluminum oxy compounds are used alone or as a mixture of two or more thereof.

Lewis acid, ionic compounds, borane compounds and carborane compounds described in Japanese Patent Application Laid-Open No. H1-1501950, Japanese Patent Application Laid-Open No. H1-502036, Japanese Patent Application Laid-Open No. H3-179005, Japanese Patent Application Laid-Open No. H3-179006, Japanese Patent Application Laid-Open No. H3-207703, Japanese Patent Application Laid-Open No. H3-207704 and U.S. Pat. No. 5,321,106, and further heteropoly compounds and isopoly compounds can be used without limitation as the component (c-3) which reacts with components (A) and (B) to form an ion pair.

As component (D), which is used as an optional component in the polymerization method according to the present invention, organoaluminum compounds same as those as the aforementioned component (c-1) may be used. Triisobutylaluminum is used in Examples in this application. In the present invention, however, the component is not limited to this compound.

The component (C) used in Examples in this application described later is an organoaluminum oxy compound (=methyl aluminoxane), which is prepared from trimethylaluminum, as the above-mentioned (C-2).

The solid catalyst component used in the production of the ethylene-based polymer [R1] according to the present invention is characterized in that the above-mentioned components (A), (B) and (C) are supported on a solid carrier (S).

The solid carrier (S) used in the present invention is an inorganic or organic compound in the form of granular or particulate solid.

The inorganic compound is preferably a porous oxide, inorganic halide, clay, clay mineral or ion-exchangeable layered compound, and is more preferably a porous oxide.

Although the properties of such porous oxides are varied depending on the type and process thereof, the particle diameter of the carrier used preferably in the present invention is 1 to 300 μm, preferably 3 to 200 μm, the specific surface area thereof is 50 to 1000 $m^2/g$, preferably 100 to 800 $m^2/g$, and the pore volume thereof is desirably in the range of 0.3 to 3.0 $cm^3/g$. The carrier is used if necessary after firing at a temperature of 80 to 1000° C., preferably 100 to 800° C.

The carriers used in Examples in this application are two types, namely, silica having an average particle diameter of 12 μm and silica having an average particle diameter of 50 μm.

The following is a description on the method for preparing the solid catalyst component according to the present invention using the above-mentioned components (S), (A), (B) and (C).

The solid catalyst component (K) in the present invention can be prepared by mixing and contacting the components (A), (B) and (C) and the solid carrier (S) with each other in an inert hydrocarbon.

Although in the preparation, the components may be mixed in any order, examples of preferable contact order include:

i) a method which comprises mixing and contacting component (S) and component (C) together, followed by mixing and contacting component (A) to prepare particulate catalyst component (K-1), separately mixing and contacting component (S) and component (C), followed by mixing and contacting component (B) to prepare solid catalyst component (K-2), and blending the solid catalyst component (K-1) and the solid catalyst component (K-2) to prepare solid catalyst component (K);

ii) a method which comprises mixing and contacting component (A) and component (C) together, followed by contacting component (S) to prepare particulate catalyst component (K-1), separately mixing and contacting component (B) and component (C), followed by contacting component (S) to prepare solid catalyst component (K-2), and blending the solid catalyst component (K-1) and the solid catalyst component (K-2) to prepare solid catalyst component (K);

iii) a method which comprises mixing and contacting component (S) and component (C) together, followed by contacting component (A) and then contacting component (B) to prepare particulate catalyst component (K);

iv) a method which comprises mixing and contacting component (S) and component (C) together, followed by contacting component (B) and then contacting component (A) to prepare particulate catalyst component (K);

v) a method which comprises mixing and contacting component (S) and component (C) together, followed by contacting a mixed component of components (A) and (B) to prepare particulate catalyst component (K); and vi) a method which comprises contacting a mixed component of components (A) and (B) with component (C), followed by contacting component (S) to prepare particulate catalyst component (K). Among these, a particularly preferable contact orders are the contact methods i) and v) as described above. The solid catalyst component (K), solid catalyst component (K-1), and solid catalyst component (K-2) which are obtained by the above-mentioned contact method may be added in their forms as they are to a polymerization system during the polymerization, or alternatively, may be used as a preliminarily polymerized catalyst component prepared by preliminarily polymerizing olefin. In the preliminary polymerization, ethylene or an olefin composed mainly of ethylene is used. The preliminary polymerization amount is from 0.01 to 1,000 g, preferably from 0.1 to 800 g, and more preferably from 0.2 to 500 g per gram of the solid catalyst component.

The solvent used in the preparation of the solid catalyst component of the present invention may be an inert hydrocarbon solvent, whose specific examples include aliphatic hydrocarbons such as propane, butane, pentane, hexane, heptane, octane, decane, dodecane and kerosine, alicyclic hydrocarbons such as cyclopentane, cyclohexane and methyl cyclopentane, aromatic hydrocarbons such as benzene, toluene and xylene, halogenated hydrocarbons such as ethylene chloride, chlorobenzene and dichloromethane or mixtures thereof. The preliminary contact time of component (A) with component (B) is usually 0 to 5 hours, preferably 0 to 1 hour, more preferably 0 to 30 minutes, and the time of subsequently contacting component (C) with solid carrier (S) is normally 0 to 24 hours, preferably 0 to 5 hours, more preferably 0 to 2 hours. These carrying procedures are conducted usually at −50 to 200° C., preferably −50 to 50° C., more preferably 0 to 40° C.

The ratio of component (A) and component (B) used, which may vary depending on the molecular weight and molecular weight distribution of a desired ethylene-based polymer, is usually determined so that the ratio of the weight ($W_A$) of a polymer originating in component (A) and the weight ($W_B$) of a polymer originating in component (B),

[=$W_A/W_B$], becomes 40/60 to 95/5, preferably 50/50 to 95/5, and particularly preferably 60/40 to 95/5. Regarding the components (A) and (B) used in Example in this application, the molar ratio of component (A) and component (B) [=(molar amount of component (A))(molar amount of component (B))] is about 0.1 to about 50.

The total transition metal atom (M) in the components (A) and (B) carried on the carrier (S) can be determined by inductively coupled plasma-emission spectrometry (ICP analysis).

The component (c-1) is used in such an amount that the molar ratio [(c-1)/M] of the component (c-1) to the total transition metal atom (M) in the components (A) and (B) becomes usually 0.01 to 100,000, preferably 0.05 to 50,000. The component (c-2) is used in such an amount that the molar ratio [(c-2)/M] of the component (c-2) to the total transition metal atom (M) in the components (A) and (B) becomes usually 10 to 500,000, preferably 20 to 100,000. The component (c-3) is used in such an amount that the molar ratio [(c-3)/M] of the component (c-3) to the total transition metal atom (M) in the components (A) and (B) becomes usually 1 to 10, preferably 1 to 5.

In the polymerization method according to the present invention, an ethylene-based polymer [R1] is obtained by polymerizing or copolymerizing ethylene and an α-olefin having 4 to 10 carbon atoms in the presence of the solid catalyst component described above.

The polymerization in the present invention can be carried out by liquid-phase polymerization such as solution polymerization or suspension polymerization or by gaseous-phase polymerization. Suspension polymerization or gaseous-phase polymerization is preferred.

Examples of inert hydrocarbon solvents used in the liquid-phase polymerization include aliphatic hydrocarbons such as propane, butane, pentane, hexane, heptane, octane, decane, dodecaneandkerosine; alicyclichydrocarbonssuchascyclopentane, cyclohexane and methylcyclopentane; aromatic hydrocarbons such as benzene, toluene and xylene; halogenated hydrocarbons such as ethylene chloride, chlorobenzene and dichloromethane, or mixtures thereof, and olefins themselves can also be used as the solvent.

When the polymerization catalyst described above is used in polymerization, the components (A) and (B) are used usually in such an amount that becomes $10^{-12}$ to $10^{-1}$ mole, preferably $10^{-8}$ to $10^{-2}$ mole, per liter of the reaction volume.

The temperature at which polymerization is conducted using the polymerization catalyst is usually in the range of −50 to +200° C., preferably 0 to 170° C., more preferably 60 to 170° C. The polymerization pressure is usually under the condition of normal pressures to 100 kg/cm², preferably normal pressure to 50 kg/cm², and the polymerization reaction can be carried out in a batch, semi-continuous or continuous process. The polymerization can also be carried out in two or more stages different in reaction conditions.

The molecular weight of the obtained ethylene-based polymer [R1] can be controlled by allowing hydrogen to be present in the polymerization system or by changing the polymerization temperature.

For the purpose of allowing polymerization to proceed smoothly, an antistatic agent, an anti-fouling agent, etc. may be used together or may be supported on a carrier.

The kind of the olefin, which can be used in the polymerization method according to the present invention, is described above. If, however, the requirements [1] through [5] are satisfied, which should be satisfied by the ethylene-based resin of the present invention, the present invention does not limit combinational use of the following olefins: cyclic olefins having 3 to 30 carbon atoms, preferably 5 to 20 carbon atoms, such as cyclopentene, cycloheptene, norbornene, 5-methyl-2-norbornene and tetracyclododecene; polar monomers such as acrylic acid, methacrylic acid, fumaric acid and maleic anhydride; α,β-unsaturated carboxylate esters such as methyl acrylate, ethyl acrylate, methyl methacrylate, ethyl methacrylate and methacrylic acid; vinyl esters such as vinyl acetate and vinyl propionate; unsaturated glycidyl such as glycidyl acrylate and glycidyl methacrylate; halogenated olefins such as vinyl fluoride and vinyl chloride; vinylcyclohexane, diene or polyene; aromatic vinyl compounds such as styrene; and functional group-containing styrene derivatives such as divinylbenzene.

In the present invention, the ethylene-based polymer [R2] as an optional component which constitutes the ethylene-based resin [R] is defined as an ethylene-based polymer which does not satisfy any one or two or more of the above-mentioned requirements [1] to [5]. Examples of such ethylene-based polymer [R2] include low density polyethylene produced using a Ziegler-Natta catalyst, such as ULTZEX 15150J and ULTZEX 20100J (manufactured by Prime Polymer Co., Ltd.), low density polyethylene with a metallocene catalyst, such as EVOLUE SP1540 and EVOLUE SP2040 (manufactured by Prime Polymer Co., Ltd.), and high-pressure low density polyethylene, such as MIRASON 11P and MIRASON 14P (manufactured by Prime Polymer Co., Ltd.). In Example 32 of the present invention, an example is shown in which an ethylene/4-methyl-1-pentene manufactured by Prime Polymer Co., Ltd. (commercial name: ULTZEX UZ15150J) was used as the ethylene-based polymer [R2]. The composition ratio of the ethylene-based polymer [R1] in the ethylene-based resin [R] is usually 99% by weight or less, preferably 70% by weight or less, and more preferably 30% by weight or less.

In some cases, a thermoplastic resin composition excellent in moldability and mechanical strength can be obtained by blending the ethylene-based resin [R] according to the present invention with a thermoplastic resin [R3] other than ethylene-based polymers [R1] and [R2]. The blending ratio of the ethylene-based resin [R] of the present invention to the thermoplastic resin [R3] is normally 99.1/0.1 to 0.1/99.9.

Examples of the thermoplastic resin [R3] include crystalline thermoplastic resin such as polyolefin, polyamide, polyester and polyacetal, non-crystalline thermoplastic resin such as polystyrene, acrylonitrile/butadiene/styrene copolymer (ABS), polycarbonate, polyphenylene oxide and polyacrylate; and polyvinyl chloride.

Specific examples of the polyolefin include propylene-based polymers, butene-based polymers, 4-methyl-1-pentene based polymers, 3-methyl-1-butene based polymers and hexene-based polymers. In particular, propylene-based polymers and 4-methyl-1-pentene based polymers are preferred.

Specific examples of the polyamide include aliphatic polyamides such as nylon-6, nylon-66, nylon-10, nylon-12 and nylon-46; and aromatic polyamides produced from aromatic dicarboxylic acid and aliphatic diamine.

Specific examples of the polyester include aromatic polyesters such as polyethylene terephthalate, polyethylene naphthalate and polybutyleneterephthalate; and polycaprolactone, polyhydroxybutyrate.

Specific examples of the polyacetal include polyformaldehyde (polyoxymethylene), polyacetaldehyde, polypropione aldehyde, polybutyl aldehyde. Among these, polyformaldehyde is particularly preferable.

The polystyrene may be a homopolymer of styrene or a binary copolymer of styrene and acrylonitrile, methyl methacrylate or α-methyl styrene.

The ABS used is preferably ABS containing 20 to 35, mol % of constitutional unit derived from acrylonitrile, 20 to 30 mol % of constitutional unit derived from butadiene and 40 to 60 mol % of constitutional unit derived from styrene.

The polycarbonate includes polymers obtained from bis(4-hydroxyphenyl)methane, 1,1-bis(4-hydroxyphenyl)ethane, 2,2-bis(4-hydroxyphenyl)propane, 2,2-bis(4-hydroxyphenyl)butane etc. In particular, a polycarbonate obtained from 2,2-bis(4-hydroxyphenyl)propane is preferable.

As the polyphenyloxide, poly(2,6-dimethyl-1,4-phenylene oxide) is preferably used.

As the polyacrylate, polymethyl methacrylate or polybutyl acrylate is preferably used.

The thermoplastic resins [R3] described above may be used alone or as a combination of two or more thereof.

Additives such as a weatherability stabilizer, a heat-resistant stabilizer, an antistatic agent, a slip inhibitor, an anti-blocking agent, a haze inhibitor, a lubricant, a pigment, a dye, a nucleating agent, a plasticizer, an aging inhibitor, an HCl absorber and an antioxidant may be incorporated into the ethylene-based resin [R] of the present invention unless the object of the present invention is affected.

A resin composition containing the ethylene-based resin [R] of the present invention and optionally a thermoplastic resin [R3] and additives can be processed to give a molded object, preferably a film, excellent in moldability and mechanical strength.

The resin composition containing the ethylene-based resin [R] of the present invention and optionally a thermoplastic resin [R3] and additives is processed by general film molding, blow molding, injection molding and extrusion molding. The film molding includes extrusion lamination molding, T-die film molding, inflation molding (air cooling, water cooling, multi-stage cooling, high-speed processing) etc. The resulting film can be used as a single-layer film, but can be endowed with various functions by using as a multilayer film. In this case, co-extrusion in each of the above molding methods can be mentioned. On the other hand, attaching lamination molding methods such as extrusion lamination molding and dry lamination can be mentioned for lamination of paper and barrier film (aluminum foil, vapor-deposited film, coating film or the like), which is difficult to be co-extruded. Preparation of a high-function product by forming it into a multi-layer through blow molding, injection molding or extrusion molding in co-extrusion molding, is also feasible as it is in film molding.

Molded objects obtained by processing the resin composition containing the ethylene-based resin [R] of the present invention and optionally a thermoplastic resin [R3] and additives include films; blow-molded transfusion bags; blow-molded bottles; gasoline tanks; tubes, pipes and ruptured caps by extrusion molding; injection moldings such as articles for daily use; fibers; and large molded products by rotational molding.

Films obtained by processing the resin composition containing the ethylene-based resin [R] of the present invention and optionally a thermoplastic resin [R3] and additives are suitable for water-wrapping bags, liquid soap-wrapping bags, liquid paper containers, laminated cloth rolls, liquid wrapping bags of special shape (standing pouch etc.), specification bags, heavy bags, wrapping film, sugar bags, oil bags, various wrapping films such as food-wrapping films, protect films, transfusion bags and agricultural materials. Further, the film may be used as a multilayer film by attaching it to a base material such as nylon, polyester etc.

Hereinafter, the present invention is described concretely by reference to Examples, but the present invention is not limited to Examples. Among the methods for analyzing and evaluating the ethylene-based resin of the present invention, ones, which are not described previously, are as follows.

[m1] Number-Average Molecular Weight (Mn), Z-Average Molecular Weight (Mz), Ratio of Weight-Average Molecular Weight to Number-Average Molecular Weight (Mw/Mn), Ratio of Z-Average Molecular Weight to Weight-Average Molecular Weight (Mz/Mw)

The number-average molecular weight (Mn), Z-average molecular weight (Mz), ratio of weight-average molecular weight to number-average molecular weight (Mw/Mn) and ratio of Z-average molecular weight to weight-average molecular weight (Mz/Mw) were measured in the following manner by using GPC/2000 manufactured by Waters. As a guard column, a Shodex AT-G was used and two AT-806 columns were used as analyzing columns. The column temperature was 140° C. o-Dichlorobenzene was used as the mobile phase and transferred at 1.0 ml/min. with 0.3 wt % BHT as an antioxidant. The concentration of a sample was 0.1 wt %. A differential refractometer and a three-capillary viscometer were used as detectors. As standard polystyrene, products of Tosoh Corporation were used. Regarding molecular weight calculation, an actually measured viscosity was determined using a viscometer and a refractometer, and the calculation was conducted by actually measuring universal calibration.

[m2] Neck-In

An ethylene-based polymer obtained was extrusion laminated on craft paper, which is a substrate, of 50 g/m$^2$ under the conditions shown below using a 65 mmφ extruder and a laminator manufactured by Sumitomo Heavy Industries, Ltd. equipped with a T die having a die width of 500 mm.

Air gap: 130 mm
Temperature of resin under die: 295° C.
Take-off rate: 80 m/min, 120 m/min, 200 m/min
Film thickness: 20 μm for a take-off rate of 80 m/min, 13 μm for a take-off rate of 120 m/min, and 8 μm for a take-off rate of 200 m/min.

When the width of the T die is $L_0$ and the width of a film laminated on the craft paper at each take-off rate is L, the neck-in is calculated by $L_0-L$.

[m3] Film Tear Speed, Take-Off Surging Occurrence Speed

An ethylene-based polymer obtained was extrusion laminated on craft paper, which is a substrate, of 50 g/m$^2$ under conditions including an air gap of 130 mm and a temperature of resin under die of 295° C., using a 65 mmφ extruder and a laminator manufactured by Sumitomo Heavy Industries, Ltd. equipped with a T die having a die width of 500 mm. The extrusion rate was set so that the film thickness became 20 μm at a take-off speed of 80 m.

The take-off speed was increased and a take-off speed when the molten film tore was taken as a film tear speed.

Further, the take-off speed was increased and the neck-in was measured five times at each take-off speed. When values on the boundary of or beyond the range of ±1.5 mm with respect to the average of the neck-in were obtained twice or more, the take-off speed was taken as a take-off surging occurrence speed.

[m4] Resin Pressure

An ethylene-based polymer obtained was extrusion laminated on craft paper, which is a substrate, of 50 g/m$^2$ so that a film with a thickness of 20 μm was formed, under conditions including an air gap of 130 mm, a temperature of resin under die of 295° C. and a take-off speed of 80 m/min, using a 65 mmφ extruder and a laminator manufactured by Sumitomo Heavy Industries, Ltd. equipped with a T die having a die width of 500 mm. In this operation, the resin pressure in a crosshead portion was measured.

[m5] Heat Seal Strength

An ethylene-based polymer obtained was extrusion laminated on a substrate so that a film with a thickness of 25 μm was formed, under conditions including an air gap of 130 mm, a temperature of resin under die of 295° C. and a take-off speed of 80 m/min, using a 65 mmφ extruder and a laminator manufactured by Sumitomo Heavy Industries, Ltd. equipped with a T die having a die width of 500 mm. As the substrate, a layered material was used, which was prepared by applying a urethane-based anchor coat agent to one side of a 15-μm thick biaxially oriented nylon film (commercial name: EMBLEM ONM, manufactured by Unitika Ltd.) and then extrusion-laminating an ethylene-based mixed resin resulting from blend of a linear low density polyethylene produced by use of a Ziegler catalyst and a high-pressure low density polyethylene each in 50 parts by weight. An ethylene-based polymer is extrusion-laminated on the side of the layered material where the ethylene-based mixed resin layer is disposed. The heat seal strength between the ethylene-based polymer layers of this extrusion laminated film was measured or evaluated by the following method:

A one-side-heating bar sealer was used.
Heat sealing pressure: 2 kg/cm$^2$
Heat sealing time: 0.5 sec
Width of a seal bar: 10 mm
Specimen width: 15 mm
Peeling angle: 180°
Peeling speed: 300 mm/min

EXAMPLE 1

[Preparation of Solid Component (S-1)]

Into a reactor having an internal volume of 260 liters equipped with a stirrer, 10 kg of silica (SiO$_2$; average particle diameter: 12 μm) dried at 250° C. for 10 hours in a nitrogen atmosphere was suspended in 90.5 liters of toluene and then cooled to 0 to 5° C. 45.5 liters of solution of methyl alumoxane (3.0 mmol/ml in terms of Al atom) in toluene was added dropwise to the suspension over 30 minutes during which the temperature in the system was kept at 0 to 5° C. Subsequently, the mixture was reacted at 0 to 5° C. for 30 minutes, then heated to 95 to 100° C. over about 1.5 hours and subsequently reacted at 95 to 100° C. for 4 hours. Thereafter, the temperature of the reaction mixture was dropped to room temperature, and the supernatant was removed by decantation. The solid component thus obtained was washed twice with toluene, and toluene was added thereto to adjust the whole volume to 129 liters to prepare a slurry of solid component (S-1) in toluene. A part of the resulting solid component was collected to examine its concentration. The result indicated that the slurry concentration was 137.5 g/L and the Al concentration was 1.1 mol/L.

[Preparation of Solid Catalyst Component (X-1)]

Into a reactor having an internal volume of 114 liters equipped with a stirrer, 21.0 liters of toluene and a 15.8-liter portion of the slurry of the solid component (S-1) in toluene (2400 g in terms of solid portion) prepared above were added under a nitrogen atmosphere. On the other hand, into a reactor having an internal volume of 100 liters equipped with a stirrer, 31.0 liters of toluene was charged under a nitrogen atmosphere, and a 10.0-liter portion of a solution of metallocene compound (A-1) in toluene (8.25 mmol/L in terms of Zr atom) was charged under stirring. Then, a 2.0-liter portion of a solution metallocene compound (B-1) in toluene (2.17 mmol/L in terms of Zr atom) was charged and mixed for several minutes [(A-1)/(B-1) molar ratio=95/5]. Subsequently, the mixed solution previously prepared was fed under pressure to the reactor containing the slurry of solid component (S-1) in toluene.

After the feeding, the mixture was reacted at an internal temperature of 20 to 25° C. for one hour, followed by removal of the supernatant by decantation. The solid catalyst component thus obtained was washed three times with hexane, and hexane was added thereto to adjust the whole volume to 56 liters to prepare a slurry of solid catalyst component (X-1) in hexane.

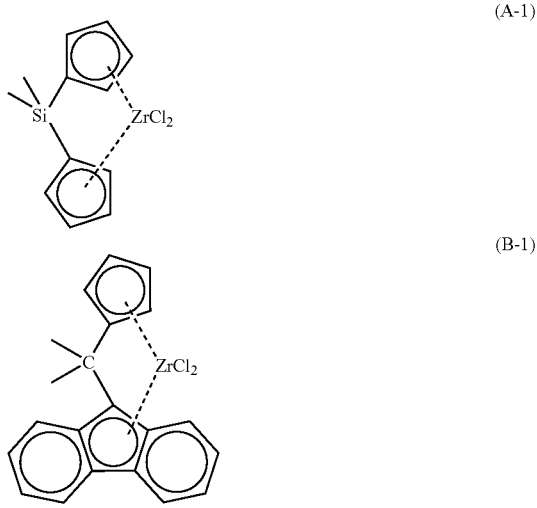

[Preparation of Preliminarily Polymerized Catalyst (XP-1)]

Subsequently, the hexane slurry of the solid catalyst component (X-1) obtained above was cooled to 10° C., and then ethylene was fed continuously for a several minutes to the system under normal pressure. In this step, the temperature of the system was kept at 10 to 15° C. Then, 2.8 mol of triisobutylaluminum (TIBAL) and 157 ml of 1-hexene were added. After the addition of 1-hexene, ethylene was fed again at a rate of 1.8 kg/hr and a preliminary polymerization was initiated. 40 minutes after the initiation of the preliminary polymerization, the temperature of the system had increased to 24° C., and thereafter, the system temperature was kept at 24 to 26° C. 70 minutes after the initiation of the preliminary polymerization, 79.0 ml of 1-hexene was added, followed by addition of another 79.0-ml portion of 1-hexene 140 minutes after the initiation of the preliminary polymerization.

220 minutes after the preliminary polymerization was initiated, the preliminary polymerization was stopped by stopping the feed of ethylene and replacing the atmosphere in the system by nitrogen. Then, the supernatant was removed by decantation, and the preliminarily polymerized catalyst thus obtained were washed six times with hexane to give a preliminarily polymerized catalyst (XP-1) wherein polymer was polymerized in an amount of 2.87 g per gram of the solid catalyst component. A part of the resulting preliminarily polymerized catalyst component was dried and examined for its composition. The result indicated that Zr atom was contained in an amount of 0.72 g per gram of the solid catalyst component.

[Polymerization]

In a perfectly stirred mixing type polymerization vessel having an internal volume of 290 liters, production of an ethylene-based polymer was conducted by use of the above-mentioned preliminarily polymerized catalyst (XP-1).

Into the polymerization vessel, hexane solvent, preliminarily polymerized catalyst (XP-1), triisobutylaluminum, ethylene and 1-hexene were continuously fed so that their rate would become 45 L/h, 0.44 mmol/h in terms of Zr atom, 20.0 mmol/hr, 6.6 kg/hr and 500 g/hr, respectively. Polymer slurry was discharged continuously from the polymerization reactor so that the amount of the solvent in the polymerization vessel would become constant, and the polymerization was carried out under conditions including a total pressure of 0.8 MPa-G, a polymerization temperature of 80° C., and a residence time of 2.6 hr. From the polymer slurry discharged continuously from the polymerization vessel, unreacted ethylene is removed substantially completely with a flash drum. Then, the hexane in the polymer slurry was removed with a solvent separator and the resultant was dried. Thus, an ethylene-based polymer was obtained at a rate of 4.4 kg/hr (see Table 1).

To the resulting ethylene-based polymer, IRGANOX 1076 hindered amine anti-oxidant (manufactured by Ciba Specialty Chemicals) and IRGAFOS 168 phosphorous anti-oxidant (manufactured by Ciba Specialty Chemicals) were added as heat-resistant stabilizers so that their amounts would become 0.1% by weight and 0.1% by weight, respectively. Then, the mixture was melt-kneaded under conditions including a set temperature of 180° C. and a screw rotation speed of 50 rpm by use of a 65-mmφ) single screw extruder manufactured by Placo Co., Ltd. Thereafter, the resultant was extruded into strands, which were then pelletized with a cutter. The pellets were used as a measurement sample. The results of physical property measurement and extrusion lamination molding conducted using the samples are shown in Table 5 and Table 10.

EXAMPLE 2 TO EXAMPLE 4

[Polymerization]

An ethylene-based polymer was obtained in the same manner as in Example 1 except for changing, in Example 1, the ethylene/1-hexene copolymerization conditions to the conditions shown in Table 1 (see Table 1). Using the resulting ethylene-based polymer, a measurement sample was prepared in the same manner as in Example 1. The results of physical property measurement and extrusion lamination molding conducted using the sample are shown in Table 5 and Table 10.

EXAMPLE 5

[Preparation of Solid Catalyst Component (X-2)]

Into a reactor having an internal volume of 114 liters equipped with a stirrer, 18.6 liter of toluene and a 7.9-liter portion of the slurry of the solid component (S-1) in toluene (1200 g in terms of solid portion) prepared above were added under a nitrogen atmosphere. On the other hand, into a reactor having an internal volume of 100 liters equipped with a stirrer, 14.5 liters of toluene was charged under a nitrogen atmosphere, and a 5.0-liter portion of a solution of metallocene compound (A-1) in toluene (7.81 mmol/L in terms of Zr atom) was charged under stirring. Then, a 2.0-liter portion of a solution metallocene compound (B-1) in toluene (2.17 mmol/L in terms of Zr atom) was charged and mixed for several minutes [(A-1)/(B-1) molar ratio=85/15]. Subsequently, the mixed solution prepared was fed under pressure to the reactor containing the slurry of solid component (S-1) in toluene. After the feeding, the mixture was reacted at an internal temperature of 20 to 25° C. for one hour. Thereafter, the supernatant was removed by decantation. The solid catalyst component thus obtained was washed three times with hexane, and hexane was added thereto to adjust the whole volume to 30 liters to prepare a slurry of solid catalyst component (X-2) in hexane.

[Preparation of Preliminarily Polymerized Catalyst (XP-2)]

Subsequently, the hexane slurry of the solid catalyst component (X-2) obtained above was cooled to 10° C., and then ethylene was fed continuously for a several minutes to the system at normal pressure. In this step, the temperature of the system was kept at 10 to 15° C. Then, 1.6 mol of triisobutylaluminum and 80 ml of 1-hexene were added. After the addition of 1-hexene, ethylene was fed again at a rate of 1.8 kg/hr and a preliminary polymerization was initiated. 25 minutes after the initiation of the preliminary polymerization, the temperature of the system had increased to 24° C., and thereafter, the system temperature was kept at 24 to 26° C. 35 minutes after the initiation of the preliminary polymerization, 39.0 ml of 1-hexene was added, followed by addition of another 39.0-ml portion of 1-hexene 60 minutes after the initiation of the preliminary polymerization.

85 minutes after the preliminary polymerization was initiated, the preliminary polymerization was stopped by stopping the feed of ethylene and replacing the atmosphere in the system by nitrogen. Thereafter, the supernatant was removed by decantation. Then, the supernatant was removed by decantation, and the preliminarily polymerized catalyst thus obtained were washed four times with hexane to give a preliminarily polymerized catalyst (XP-2) wherein polymer was polymerized in an amount of 2.93 g per gram of the solid catalyst component. A part of the resulting preliminarily polymerized catalyst component was dried and examined for its composition. The result indicated that Zr atom was contained in an amount of 0.72 g per gram of the solid catalyst component.

[Polymerization]

An ethylene-based polymer was obtained using preliminarily polymerized catalyst (XP-2) in the same manner as in Example 1 except for changing, in Example 1, the ethylene/1-hexene copolymerization conditions to the conditions shown in Table 1. Using the resulting ethylene-based polymer, a measurement sample was prepared in the same manner as in Example 1. The results of physical property measurement and extrusion lamination molding conducted using the sample are shown in Table 5 and Table 10.

EXAMPLE 6 TO EXAMPLE 8

[Polymerization]

An ethylene-based polymer was obtained in the same manner as in Example 5 except for changing, in Example 5, the ethylene-1-hexene copolymerization conditions to the conditions shown in Table 1. Using the resulting ethylene-based polymer, a measurement sample was prepared in the same manner as in Example 1. The results of physical property measurement and extrusion lamination molding conducted using the sample are shown in Table 5 and Table 10, wherein in Example 6, only physical property measurement was conducted.

EXAMPLE 9

[Polymerization]

An ethylene-based polymer was obtained in the same manner as in Example 5 except for changing, in Example 5, the ethylene/1-hexene copolymerization conditions to the conditions shown in Table 1. When the density of the polymer became less than 935 kg/m$^3$, the supernatant of the polymer slurry extracted from the polymerization reactor became cloudy. 8 hours after the density of the polymer reached 920 kg/m$^3$, the polymer and the solvent failed to separate or the slurry property became worse. Therefore, the continuous operation was stopped. Using the ethylene-based polymer obtained before the shutdown of the operation, a measurement sample was prepared in the same manner as in Example 1. The results of physical property measurement and extrusion lamination molding conducted using the sample are shown in Table 5 and Table 10.

EXAMPLE 10

[Preparation of Solid Component (S-2)]

30 g of silica (SiO$_2$; average particle diameter: 50 μm) dried at 250° C. for 10 hours in a nitrogen stream was suspended in 460 ml of toluene and then cooled to 0° C. 140 ml of solution of methyl alumoxane in toluene (1.52 mmol/ml in terms of Al atom) was added dropwise to the suspension over one hour. In this step, the temperature of the system was kept at 0 to 2° C. Subsequently, the mixture was reacted at 0° C. for 30 minutes, then heated to 95° C. over 1.5 hours and reacted at this temperature for 4 hours. Thereafter, the temperature of the reaction mixture was decreased to 60° C., and the supernatant was removed by decantation. The solid component thus obtained was washed three times with toluene, and toluene was added thereto to prepare slurry of the solid component (S-2) in toluene. A part of the resulting solid component (S-2) was collected to examine its concentration. The result indicated that the slurry concentration was 0.1665 g/ml and the Al concentration was 0.697 mmol/ml.

[Preparation of Solid Catalyst Component (X-3)]

50 ml of toluene was introduced into a 200-ml glass flask flushed with nitrogen, and then the slurry of the solid component (S-2) in toluene (1.0 g in terms of solid portion) prepared above was charged under stirring. Next, a mixed solution of 11.2 ml of solution of metallocene compound (A-1) in toluene (0.0015 mmol/ml in terms of Zr atom) and 2.8 ml of solution of metallocene compound (B-1) in toluene (0.0015 mmol/ml in terms of Zr atom) mixed previously was added dropwise, followed by reaction at room temperature for one hour. Thereafter, the supernatant was removed by decantation, and the resultant was washed twice with decane and converted into decane slurry [solid catalyst component (X-3)]. The molar ratio of the metallocene compounds (A-1) and (B-1) mixed in the solid catalyst component preparation is (A-1) (B-1)=80/20. A part of the resulting slurry of the solid catalyst component (X-3) in decane was collected to examine its concentration. The result indicated that the Zr concentration was 0.037 mg/ml, and the Al concentration was 2.27 mg/ml.

[Polymerization]

500 ml of purified heptane was introduced into an SUS autoclave having an internal volume of 1 liter purged sufficiently with nitrogen, and the liquid phase and gaseous phase were saturated with ethylene by flowing ethylene. Then, the atmosphere in the system was replaced by a hydrogen/ethylene mixed gas (hydrogen concentration: 0.45 vol %), and then 10 ml of 1-hexene, 0.375 mmol of triisobutyl aluminum and solid catalyst component (X-3) in an amount of 0.01 mmol in terms of zirconium were introduced thereinto in this order. The mixture was heated to 80° C. and polymerized for 90 minutes at a pressure of 0.78 MPa-G. The resulting polymer was vacuum-dried for 10 hours to give 87.4 g of ethylene-based polymer. The conditions of the production of the polymer obtained in Example 10 are shown in Table 2.

In order to prepare a measurement sample, IRGANOX 1076 hindered amine anti-oxidant (manufactured by Ciba Specialty Chemicals) and IRGAFOS 168 phosphorous anti-oxidant (manufactured by Ciba Specialty Chemicals) were added as heat-resistant stabilizers to the resulting ethylene-based polymer so that their amounts would become 0.1% by weight and 0.1% by weight, respectively. Then, (as mentioned previously) the mixture was melt-kneaded at a resin temperature of 180° C. at a revolution speed of 50 rpm for 5 minutes in a Laboplast mill manufactured by Toyo Seiki Seisaku-sho, Ltd. This melted polymer was cooled under the conditions of a cooling temperature of 20° C., a cooling time of 5 minutes and a cooling pressure of 100 kg/cm$^2$ with a press-molding machine manufactured by Shinto Metal Industries, Ltd. The results of the physical property measurement using this sample are shown in Table 6.

EXAMPLE 11

[Preparation of Solid Catalyst Component (X-4)]

38.9 ml of toluene was introduced into a 200-ml glass flask flushed with nitrogen, and then the slurry of the solid component (S-1) in toluene (2.0 g in terms of solid portion) prepared in Example 1 was charged under stirring. Next, a mixed solution of 34.4 ml of solution of metallocene compound (A-1) in toluene (0.002 mmol/ml in terms of Zr atom) and 3.6 ml of solution of metallocene compound (B-1) in toluene (0.001 mmol/ml in terms of Zr atom) mixed previously was added dropwise, followed by reaction at room temperature for one hour. Thereafter, the supernatant was removed by decantation, and the remaining solids were washed twice with decane and converted into decane slurry [solid catalyst component (X-4)]. The mixing molar ratio of the metallocene compounds (A-1) and (B-1) at a process of the solid catalyst component preparation is (A-1)/(B-1)=95/5. A part of the resulting slurry of the solid catalyst component (X-4) in decane was collected to examine its concentration. The result indicated that the Zr concentration was 0.062 mg/ml, and the Al concentration was 3.64 mg/ml.

[Polymerization]

A method same as in Example 10 was performed except for using a hydrogen-ethylene mixed gas (hydrogen concentration: 0.2 vol %) and solid catalyst component (X-4) in an amount of 0.0025 mmol in terms of zirconium in the polymerization of Example 10. The resulting polymer was vacuum-dried for 10 hours to give 71.1 g of ethylene-based polymer. The conditions of the production of the polymer obtained in Example 11 are shown in Table 2. Using the resulting ethylene-based polymer, a measurement sample was prepared in the same manner as in Example 10. The results of the physical property measurement using this sample are shown in Table 6.

EXAMPLE 12

[Preparation of Solid Catalyst Component (X-5)]

50 ml of toluene was introduced into a 200-ml glass flask flushed with nitrogen, and then the slurry of the solid component (S-1) in toluene (2.0 g in terms of solid portion) prepared above was charged under stirring. Next, a mixed solution of 44.0 ml of solution of metallocene compound (A-1) in toluene (0.0015 mmol/ml in terms of Zr atom) and 1.83 ml of solution of metallocene compound (B-1) in toluene (0.0015 mmol/ml in terms of Zr atom) mixed previously was added dropwise, followed by reaction at room temperature for one hour. Thereafter, the supernatant was removed by decantation, and the remaining solids were washed twice with decane and converted into decane slurry [solid catalyst component (X-5)]. The mixing molar ratio of the metallocene compounds (A-1) and (B-1) at a process of the solid catalyst component preparation is (A-1)/(B-1)=96/4. A part of the resulting slurry of the solid catalyst component (X-5) in decane was collected to examine its concentration. The result indicated that the Zr concentration was 0.061 mg/ml, and the Al concentration was 3.71 mg/ml.

[Polymerization]

A method same as in Example 10 was performed except for using a hydrogen-ethylene mixed gas (hydrogen concentration: 0.1 vol %) and solid catalyst component (X-5) in an amount of 0.0025 mmol in terms of zirconium in the polymerization of Example 10. The resulting polymer was vacuum-dried for 10 hours to give 46.2 g of ethylene-based polymer. The conditions of the production of the polymer obtained in Example 12 are shown in Table 2. Using the resulting ethylene-based polymer, a measurement sample was prepared in the same manner as in Example 10. The results of the physical property measurement using this sample are shown in Table 6.

EXAMPLE 13

A method same as in Example 12 was performed except for using a hydrogen-ethylene mixed gas (hydrogen concentration: 0.2 vol %) in the polymerization of Example 12. The resulting polymer was vacuum-dried for 10 hours to give 52.2 g ethylene-based polymer. The conditions of the production of the polymer obtained in Example 13 are shown in Table 2. Using the resulting ethylene-based polymer, a measurement sample was prepared in the same manner as in Example 10. The results of the physical property measurement using this sample are shown in Table 6.

EXAMPLE 14

A method same as in Example 12 was performed except for using a hydrogen-ethylene mixed gas (hydrogen concentration: 0.25 vol %) in the polymerization of Example 12. The resulting polymer was vacuum-dried for 10 hours to give 58.6 g of ethylene-based polymer. The conditions of the production of the polymer obtained in Example 14 are shown in Table 2. Using the resulting ethylene-based polymer, a measurement sample was prepared in the same manner as in Example 10. The results of the physical property measurement using this sample are shown in Table 6.

EXAMPLE 15

[Preparation of Solid Catalyst Component (X-6)]

Solid catalyst component (X-6) was prepared in the same manner as in Example 12, except for changing the amount of the toluene slurry of solid component (S-1) to 1.9 g in terms of solid portion and using 40.3 ml of solution of metallocene compound (A-1) in toluene (0.0015 mmol/ml in terms of Zr atom) and 5.50 ml of solution of metallocene compound (B-1) in toluene (0.0015 mmol/ml in terms of Zr atom) in the preparation of solid catalyst component (X-5) of Example 12. The mixing molar ratio of the metallocene compounds (A-1) and (B-1) at a process of the solid catalyst component preparation is (A-1)/(B-1)=88/12. A part of the resulting slurry of the solid catalyst component (X-6) in decane was collected to examine its concentration. The result indicated that the Zr concentration was 0.059 mg/ml, and the Al concentration was 3.43 mg/ml.

[Polymerization]

A method same as in Example 10 was performed except for using a hydrogen-ethylene mixed gas (hydrogen concentration: 0.75 vol %) and solid catalyst component (X-6) in an amount of 0.0025 mmol in terms of zirconium in the polymerization of Example 10. The resulting polymer was vacuum-dried for 10 hours to give 71.3 g of ethylene-based polymer. The conditions of the production of the polymer obtained in Example 15 are shown in Table 2. Using the resulting ethylene-based polymer, a measurement sample was prepared in the same manner as in Example 10. The results of the physical property measurement using this sample are shown in Table 6.

EXAMPLE 16

A method same as in Example 15 was performed except for using a hydrogen-ethylene mixed gas (hydrogen concentration: 0.83 vol %) in the polymerization of Example 15. The resulting polymer was vacuum-dried for 10 hours to give 65.9 g of ethylene-based polymer. The conditions of the production of the polymer obtained in Example 16 are shown in Table 2. Using the resulting ethylene-based polymer, a measurement sample was prepared in the same manner as in Example 10. The results of the physical property measurement using this sample are shown in Table 6.

EXAMPLE 17

[Preparation of Solid Catalyst Component (X-7)]

Solid catalyst component (X-7) was prepared in the same manner as in Example 12, except for changing the amount of the toluene slurry of solid component (S-1) to 1.0 g in terms of solid portion and using 16.6 ml of solution of metallocene compound (A-1) in toluene (0.002 mmol/ml in terms of Zr atom) and 2.89 ml of solution of metallocene compound (B-1) in toluene (0.001 mmol/ml in terms of Zr atom) in the preparation of solid catalyst component (X-5) of Example 12. The mixing molar ratio of the metallocene compounds (A-1) and (B-1) at a process of the solid catalyst component preparation is (A-1)/(B-1)=92/8. A part of the resulting slurry of the solid catalyst component (X-7) in decane was collected to examine its concentration. The result indicated that the Zr concentration was 0.058 mg/ml, and the Al concentration was 3.52 mg/ml.

[Polymerization]

A method same as in Example 10 was performed except for using a hydrogen-ethylene mixed gas (hydrogen concentration: 0.65 vol %), changing the amount of 1-hexene to 3 ml, and using solid catalyst component (X-7) in an amount of 0.0026 mmol in terms of zirconium in the polymerization of Example 10. The resulting polymer was vacuum-dried for 10 hours to give 63.9 g ethylene-based polymer. The conditions of the production of the polymer obtained in Example 17 are shown in Table 3. Using the resulting ethylene-based polymer, a measurement sample was prepared in the same manner as in Example 10. The results of the physical property measurement using this sample are shown in Table 7.

EXAMPLE 18

[Preparation of Solid Catalyst Component (X-8)]

Solid catalyst component (X-8) was prepared in the same manner as in Example 12 except for using 32.5 ml of solution of metallocene compound (A-1) in toluene (0.002 mmol/ml in terms of Zr atom) and 7.23 ml solution of metallocene compound (B-1) in toluene (0.001 mmol/ml in terms of Zr atom) in the preparation of solid catalyst component (X-5) of Example 12. The mixing molar ratio of the metallocene compounds (A-1) and (B-1) at a process of the solid catalyst component preparation is (A-1)/(B-1)=90/10. A part of the resulting slurry of the solid catalyst component (X-8) in decane was collected to examine its concentration. The result indicated that the Zr concentration was 0.065 mg/ml, and the Al concentration was 3.77 mg/ml.

[Polymerization]

A method same as in Example 10 was performed except for changing the polymerization temperature to 70° C., using a hydrogen-ethylene mixed gas (hydrogen concentration: 0.064 vol %), changing the amount of 1-hexene to 30 ml, and using solid catalyst component (X-8) in an amount of 0.0026 mmol in terms of zirconium in the polymerization of Example 10. The resulting polymer was vacuum-dried for 10 hours to give 92.9 g of ethylene-based polymer. The conditions of the production of the polymer obtained in Example 18 are shown in Table 3. Using the resulting ethylene-based polymer, a measurement sample was prepared in the same manner as in Example 10. The results of the physical property measurement using this sample are shown in Table 7.

EXAMPLE 19

A method same as in Example 18 was performed except for using 0.1 g of solid catalyst component (X-7) in the polymerization of Example 18. The resulting polymer was vacuum-dried for 10 hours to give 44.5 g of ethylene-based polymer. The conditions of the production of the polymer obtained in Example 19 are shown in Table 3. Using the resulting ethylene-based polymer, a measurement sample was prepared in the same manner as in Example 10. The results of the physical property measurement using this sample are shown in Table 7.

EXAMPLE 20

[Preparation of Preliminarily Polymerized Catalyst (XP-4)]

52.7 ml of hexane was introduced into a 200-ml glass flask flushed with nitrogen, and then the slurry of the solid catalyst component (X-4) in hexane (4.0 g in terms of solid portion) prepared above was charged. Then, after cooling to 10° C., 5.32 mmol of TIBAL and 0.535 ml of 1-hexene were added, and feed of ethylene at 30 L/hr was started under normal pressure. Polymerization was continued at 25° C. until the cumulative amount of ethylene absorbed by the solid catalyst component became 10.3 liters. After the completion of the polymerization, replacing the atmosphere in the system by nitrogen finished the preliminary polymerization. Thereafter, the supernatant was removed by decantation, and the remaining solids were washed three times with decane and converted into decane slurry to prepare preliminarily polymerized catalyst (XP-4). A part of the resulting slurry of the preliminarily polymerized catalyst (XP-4) in decane was collected to examine its concentration. The result indicated that the Zr concentration was 0.067 mg/ml, and the Al concentration was 4.77 mg/ml.

[Polymerization]

A method same as in Example 10 was performed except for changing the polymerization temperature to 70° C., using ethylene gas, changing the amount of 1-hexene to 30 ml, and using preliminarily polymerized catalyst (XP-4) in an amount of 0.0026 mmol in terms of zirconium in the polymerization of Example 10. The resulting polymer was vacuum-dried for 10 hours to give 60.8 g of ethylene-based polymer. The conditions of the production of the polymer obtained in Example 20 are shown in Table 3. Using the resulting ethylene-based polymer, a measurement sample was prepared in the same manner as in Example 10. The results of the physical property measurement using this sample are shown in Table 7.

EXAMPLE 21

[Preparation of Preliminarily Polymerized Catalyst (XP-9)]

Solid catalyst component (X-9) was prepared in the same manner as in Example 12, except for using 14.5 ml of solution of metallocene compound (A-1) in toluene (0.004 mmol/ml in terms of Zr atom) and 7.23 ml of solution of metallocene compound (B-1) in toluene (0.002 mmol/ml in terms of Zr atom) in the preparation of solid catalyst component (X-5) of Example 12. The mixing molar ratio of the metallocene compounds (A-1) and (B-1) at a process of the solid catalyst component preparation is (A-1)/(B-1)=80/20. Subsequently, a slurry of preliminarily polymerized catalyst (XP-9) in decane was prepared in the same manner as the preparation of preliminarily polymerized catalyst (XP-4) of Example 20. A part of the resulting slurry of the preliminarily polymerized catalyst (XP-9) indecane was collected to examine its concentration. The result indicated that the Zr concentration was 0.062 mg/ml, and the Al concentration was 4.16 mg/ml.

[Polymerization]

A method same as in Example 10 was performed except for changing the polymerization temperature to 50° C., using ethylene gas, changing the amount of 1-hexene to 50 ml, and using preliminarily polymerized catalyst (XP-9) in an amount of 0.0012 mmol in terms of zirconium in the polymerization of Example 10. The resulting polymer was vacuum-dried for 10 hours to give 25.6 g of ethylene-based polymer. The conditions of the production of the polymer obtained in Example 21 are shown in Table 3. Using the resulting ethylene-based polymer, a measurement sample was prepared in the same manner as in Example 10. The results of the physical property measurement using this sample are shown in Table 7.

EXAMPLE 22

[Preparation of Preliminarily Polymerized Catalyst (XP-10)]

Solid catalyst component (X-10) was prepared in the same manner as in Example 12 except for using 12.7 ml of solution of metallocene compound (A-1) in toluene (0.004 mmol/ml in terms of Zr atom) and 10.8 ml of solution of metallocene compound (B-1) in toluene (0.002 mmol/ml in terms of Zr atom) in the preparation of solid catalyst component (X-5) of Example 12. The mixing molar ratio of the metallocene compounds (A-1) and (B-1) at a process of the solid catalyst component preparation is (A-1)/(B-1)=70/30. Subsequently, a slurry of preliminarily polymerized catalyst (XP-10) in decane was prepared in the same manner as the preparation of preliminarily polymerized catalyst (XP-4) of Example 20. A part of the resulting slurry of the preliminarily polymerized catalyst (XP-10) in decane was collected to examine its concentration. The result indicated that the Zr concentration was 0.060 mg/ml, and the Al concentration was 4.12 mg/ml.

[Polymerization]

A method same as in Example 10 was performed except for changing the polymerization temperature to 50° C., using ethylene gas, changing the amount of 1-hexene to 50 ml, and using preliminarily polymerized catalyst (XP-10) in an amount of 0.002 mmol in terms of zirconium in the polymerization of Example 10. The resulting polymer was vacuum-dried for 10 hours to give 56.6 g of ethylene-based polymer. The conditions of the production of the polymer obtained in Example 22 are shown in Table 3. Using the resulting ethylene-based polymer, a measurement sample was prepared in the same manner as in Example 10. The results of the physical property measurement using this sample are shown in Table 7.

EXAMPLE 23

A method same as in Example 22 was performed except for changing the amount of 1-hexene to 40 ml in the polymerization of Example 22. The resulting polymer was vacuum-dried for 10 hours to give 50.3 g of ethylene-based polymer. The conditions of the production of the polymer obtained in Example 23 are shown in Table 0.3. Using the resulting ethylene-based polymer, a measurement sample was prepared in the same manner as in Example 10. The results of the physical property measurement using this sample are shown in Table 7.

EXAMPLE 24

[Preparation of Preliminarily Polymerized Catalyst (XP-11)]

Solid catalyst component (X-11) was prepared in the same manner as in Example 12 except for using only 18.1 ml of solution of metallocene compound (A-1) in toluene (0.004 mmol/ml in terms of Zr atom) in the preparation of solid catalyst component (X-5) of Example 12. Subsequently, a slurry of preliminarily polymerized catalyst (XP-11) in decane was prepared in the same manner as the preparation of preliminarily polymerized catalyst (XP-4) of Example 20. A part of the resulting slurry of the preliminarily polymerized catalyst (XP-11) in decane was collected to examine its concentration. The result indicated that the Zr concentration was 0.065 mg/ml, and the Al concentration was 5.46 mg/ml.

[Preparation of Preliminarily Polymerized Catalyst (XP-12)]

Solid catalyst component (X-12) was prepared in the same manner as in Example 12 except for using only 18.1 ml of solution of metallocene compound (B-1) in toluene (0.004 mmol/ml in terms of Zr atom) in the preparation of solid catalyst component (X-5) of Example 12. Subsequently, a slurry of preliminarily polymerized catalyst (XP-12) in decane was prepared in the same manner as the preparation of preliminarily polymerized catalyst (XP-4) of Example 20. A part of the resulting slurry of the preliminarily polymerized catalyst (XP-12) in decane was collected to examine its concentration. The result indicated that the Zr concentration was 0.063 mg/ml, and the Al concentration was 3.72 mg/ml.

[Polymerization]

500 ml of purified heptane was introduced into an SUS autoclave having an internal volume of 1 liter purged sufficiently with nitrogen, and the liquid phase and gaseous phase were saturated with ethylene by flowing ethylene. Subsequently, the atmosphere in the system was replaced by a hydrogen-ethylene mixed gas (hydrogen concentration: 0.20 vol %). Then, 3 ml of 1-hexene and 0.375 mmol of triisobutylaluminum were added, followed by charging of preliminarily polymerized catalyst (XP-11) in an amount of 0.0025 mmol in terms of zirconium and preliminarily polymerized catalyst (XP-12) in an amount of 0.00028 mmol in terms of zirconium [zirconium molar ratio: preliminarily polymerized catalyst (XP-11)/preliminarily polymerized catalyst (XP-12)=90/10]. The mixture was heated to 80° C. and polymerized for 90 minutes at a pressure of 0.78 MPa-G. The resulting polymer was vacuum-dried for 10 hours to give 55.3 g of ethylene-based polymer. The conditions of the production of the polymer obtained in Example 24 are shown in Table 3. Using the resulting ethylene-based polymer, a measurement sample was prepared in the same manner as in Example 10. The results of the physical property measurement using this sample are shown in Table 7.

EXAMPLE 25

A method same as in Example 24 was performed except for changing the polymerization temperature to 70° C., using ethylene gas, and changing the amount of 1-hexene to 30 ml in the polymerization of Example 24. The resulting polymer was vacuum-dried for 10 hours to give 76.8 g of ethylene-based polymer. The conditions of the production of the polymer obtained in Example 25 are shown in Table 4. Using the resulting ethylene-based polymer, a measurement sample was prepared in the same manner as in Example 10. The results of the physical property measurement using this sample are shown in Table 8.

EXAMPLE 26

A method same as in Example 25 was performed except for using a hydrogen-ethylene mixed gas (hydrogen concentration: 0.20 vol %) in place of the ethylene gas in the polymerization of Example 25. The resulting polymer was vacuum-dried for 10 hours to give 62.8 g of ethylene-based polymer. The conditions of the production of the polymer obtained in Example 26 are shown in Table 4. Using the resulting ethylene-based polymer, a measurement sample was prepared in the same manner as in Example 10. The results of the physical property measurement using this sample are shown in Table 8.

EXAMPLE 27

A method same as in Example 25 was performed except for using a hydrogen-ethylene mixed gas (hydrogen concentration: 0.31 vol %) in place of the ethylene gas in the polymerization of Example 25. The resulting polymer was vacuum-dried for 10 hours to give 72.3 g of ethylene-based polymer. The conditions of the production of the polymer obtained in Example 27 are shown in Table 4. Using the resulting ethylene-based polymer, a measurement sample was prepared in the same manner as in Example 10. The results of the physical property measurement using this sample are shown in Table 8.

EXAMPLE 28

500 ml of purified heptane was introduced into an SUS autoclave having an internal volume of 1 liter purged sufficiently with nitrogen, and the atmosphere in the system was replaced with ethylene by flowing ethylene. Subsequently, 30 ml of 1-hexene and 0.375 mmol of triisobutylaluminum were added, followed by charging of preliminarily polymerized catalyst (XP-11) in an amount of 0.00238 mmol in terms of zirconium and preliminarily polymerized catalyst (XP-12) in an amount of 0.00013 mmol in terms of zirconium [zirconium molar ratio: preliminarily polymerized catalyst (XP-11)/preliminarily polymerized catalyst (XP-12)=95/5]. The mixture was heated to 70° C. and polymerized for 90 minutes at a pressure of 0.78 MPa-G. The resulting polymer was vacuum-dried for 10 hours to give 60.9 g of ethylene-based polymer. The conditions of the production of the polymer obtained in Example 28 are shown in Table 4. Using the resulting ethylene-based polymer, a measurement sample was prepared in the same manner as in Example 10. The results of the physical property measurement using this sample are shown in Table 8.

EXAMPLE 29

[Preparation of Solid Catalyst Component (X-13)]

50 ml of toluene was introduced into a 200-ml glass flask flushed with nitrogen, and then the slurry of the solid component (S-2) in toluene (2.0 g in terms of solid portion) prepared above was charged under stirring. Next, a mixed solution of 37.6 ml of solution of metallocene compound (A-1) in toluene (0.001 mmol/ml in terms of Zr atom) and 4.18 ml solution of metallocene compound (B-2) in toluene (0.001 mmol/ml in terms of Zr atom) mixed previously was added dropwise, followed by reaction at room temperature for one hour. Thereafter, the supernatant was removed by decantation, and the remaining solids were washed twice with decane and converted into decane slurry [solid catalyst component (X-13)]. The mixing molar ratio of the metallocene compounds (A-1) and (B-2) at a process of the solid catalyst component preparation is (A-1)/(B-2)=90/10. A part of the resulting slurry of the solid catalyst component (X-13) in decane was collected to examine its concentration. The result indicated that the Zr concentration was 0.035 mg/ml, and the Al concentration was 2.46 mg/ml.

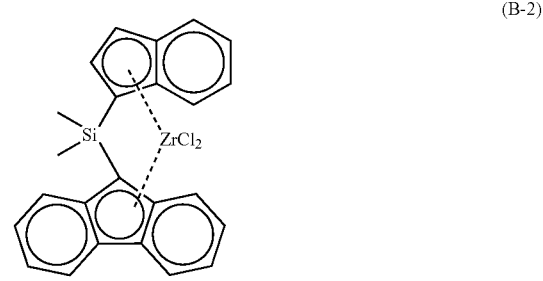

(B-2)

[Polymerization]

A method same as in Example 10 was performed except for using a hydrogen-ethylene mixed gas (hydrogen concentration: 0.31 vol %) and solid catalyst component (X-13) in an amount of 0.003 mmol in terms of zirconium in the polymerization of Example 10. The resulting polymer was vacuum-dried for 10 hours to give 38.4 g of ethylene-based polymer. The conditions of the production of the polymer obtained in Example 29 are shown in Table 4. Using the resulting ethylene-based polymer, a measurement sample was prepared in the same manner as in Example 10. The results of the physical property measurement using this sample are shown in Table 8.

EXAMPLE 30

[Preparation of Solid Catalyst Component (X-14)]

50 ml of toluene was introduced into a 200-ml glass flask flushed with nitrogen, and then the slurry of the solid component (S-2) in toluene (1.0 g in terms of solid portion) prepared above was charged under stirring. Next, a mixed solution of 2.25 ml of solution of metallocene compound (A-2) in toluene (0.002 mmol/ml in terms of Zr atom) and 9.01 ml of solution of metallocene compound (B-1) in toluene (0.002 mmol/ml in terms of Zr atom) mixed previously was added dropwise, followed by reaction at room temperature for one hour. Thereafter, the supernatant was removed by decantation, and the remaining solids were washed twice with decane and converted into decane slurry [solid catalyst component (X-14)]. The mixing molar ratio of the metallocene compounds (A-2) and (B-1) at a process of the solid catalyst component preparation is (A-2)/(B-1)=20/80. A part of the resulting slurry of the solid catalyst component (X-14) in decane was collected to examine its concentration. The result indicated that the Zr concentration was 0.015 mg/ml, and the Al concentration was 1.27 mg/ml.

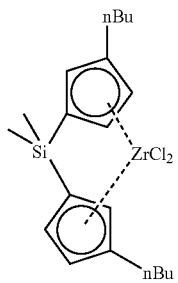

(A-2)

[Polymerization]

A method same as in Example 10 was performed except for using ethylene gas, a polymerization temperature of 70° C. and using solid catalyst component (X-14) in an amount of 0.0005 mmol in terms of zirconium in the polymerization of Example 10. The resulting polymer was vacuum-dried for 10 hours to give 72.0 g of ethylene-based polymer. The conditions of the production of the polymer obtained in Example 30 are shown in Table 4. Using the resulting ethylene-based polymer, a measurement sample was prepared in the same manner as in Example 10. The results of the physical property measurement using this sample are shown in Table 8.

EXAMPLE 31

[Preparation of Solid Catalyst Component (X-15)]

50 ml of toluene was introduced into a 200-ml glass flask flushed with nitrogen, and then the slurry of the solid component (S-2) in toluene (1.0 g in terms of solid portion) prepared above was charged under stirring. Next, a mixed solution of 4.18 ml of solution of transition metal compound (A-3) in toluene (0.001 mmol/ml in terms of Zr atom) and 11.15 ml of solution of metallocene compound (B-1) in toluene (0.0015 mmol/ml in terms of Zr atom) mixed previously was added dropwise, followed by reaction at room temperature for one hour. Thereafter, the supernatant was removed by decantation, and the remaining solids were washed twice with decane and converted into decane slurry [solid catalyst component (X-15)]. The mixing molar ratio of the transition metal compound (A-3) to metallocene compound (B-1) at a process of the solid catalyst component preparation is (A-3)/(B-1)= 20/80. A part of the resulting slurry of the solid catalyst component (X-15) in decane was collected to examine its concentration. The result indicated that the Zr concentration was 0.034 mg/ml, and the Al concentration was 2.17 mg/ml.

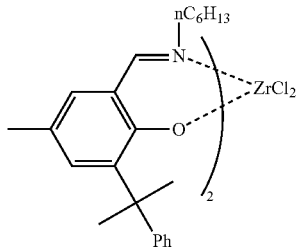

(A-3)

[Polymerization]

A method same as in Example 10 was performed except for using a hydrogen-ethylene mixed gas (hydrogen concentration: 0.02 vol %) and solid catalyst component (X-15) in an amount of 0.001 mmol in terms of zirconium in the polymerization of Example 10. The resulting polymer was vacuum-dried for 10 hours to give 67.7 g of ethylene-based polymer. The conditions of the production of the polymer obtained in Example 31 are shown in Table 4. Using the resulting ethylene-based polymer, a measurement sample was prepared in the same manner as in Example 10. The results of the physical property measurement using this sample are shown in Table 8.

COMPARATIVE EXAMPLE 1

Product pellets of ethylene/4-methyl-1-pentene copolymer (trade name: ULTZEX 20100J) produced by solution polymerization, commercially available from Prime Polymer Co., Ltd. were used to prepare a measurement sample to evaluate its physical properties and were subjected to extrusion lamination molding. The results are shown in Tables 9 and 10.

Comparative Example 1 fails to satisfy the requirement with respect to MT/$\eta$* provided in claim 1. For this reason, the neck-in is greater than those in Examples.

COMPARATIVE EXAMPLE 2

Product pellets of polyethylene (trade name: MIRASON 11) produced by high-pressure radical polymerization, commercially available from Prime Polymer Co., Ltd. were used to prepare a measurement sample to evaluate its physical properties and were subjected to extrusion lamination molding. The results are shown in Tables 9 and 10.

Comparative Example 2 fails to satisfy the requirement with respect to the sum of the numbers of methyl branches and ethyl branches (A+B) provided in claim 1. For this reason, the heat seal strength is inferior to those in Examples.

COMPARATIVE EXAMPLE 3

[Preparation of Solid Component (S-3)]

Into a reactor having an internal volume of 180 liters equipped with a stirrer, 10 kg of silica ($SiO_2$) dried at 250° C. for 10 hours under a nitrogen atmosphere was suspended in 77 liter of toluene and then cooled to a range of 0 to 5° C. 39.5 liter of solution of methyl alumoxane in toluene (1.79 mmol/ml in terms of Al atom) was added dropwise to the suspension over one hour. In this step, the temperature of the system was kept at a range of 0 to 5° C. Subsequently, the mixture was reacted at a range of 0 to 5° C. for 30 minutes, then heated to a range of 95 to 100° C. over 1.5 hours and reacted at this temperature for 4 hours. Thereafter, the temperature of the reaction mixture was decreased to a range of 55 to 60° C., and the supernatant was removed by decantation. The solid component thus obtained was washed four times with toluene, and toluene was added thereto to adjust the whole volume to 166.3 liters to prepare a slurry of solid component (S-3) in toluene. A part of the resulting solid component (S-3) was collected to examine its concentration. The result indicated that the slurry concentration was 84.6 g/L and the Al concentration was 0.422 mol/L.

[Preparation of Solid Catalyst Component (X-16)]

Then, 11.8 liter (1000 g in terms of solid portion) of the toluene slurry of solid component (S-3) prepared above was added to a reactor having an internal volume of 114 liters equipped with a stirrer under a nitrogen atmosphere. 14.7 liter of solution of ethylene bis(indenyl)zirconium dichloride (0.0017 mmol/ml in terms of Zr atom) in toluene was added dropwise under stirring at a range of 78 to 80° C. over 30 minutes, and the mixture was reacted at this temperature for 2 hours. Thereafter, the supernatant was removed, and the remaining solids were washed twice with hexane, and hexane was added thereto to adjust the whole volume to 25 liters to prepare a slurry of solid catalyst component (X-0.16) in hexane.

[Preparation of Preliminarily Polymerized Catalyst (XP-16)]

The hexane slurry of the solid catalyst component (X-16) obtained above was cooled to 5° C., and then ethylene was fed continuously to the system at normal pressures. In this step, the temperature of the system was kept at a range of 10 to 15° C. Thereafter, 1.9 liter of solution of triisobutyl aluminum in hexane (40.0 mmol/L in terms of Al atom) and 65.3 mL of 1-hexene were added thereto to initiate preliminary polymerization. After one hour, the temperature of the system increased to 35° C., and thereafter, the system temperature was kept at a range of 34 to 35° C. 70 minutes after the preliminary polymerization was initiated, 65.3 ml of 1-hexene was added again.

Four hours after the preliminary polymerization was initiated, the atmosphere in the system was replaced by nitrogen to terminate the preliminary polymerization. Then, the supernatant was removed, and the remaining solids were washed four times with hexane, to give a preliminarily polymerized catalyst (XP-16) wherein polymer was preliminarily polymerized in an amount of 3 g per gram of solid catalyst component (XP-16). Then, the temperature in the system was increased to a range of 34 to 35° C., and 10 liter of solution of EMULGEN 108 (polyoxyethylene lauryl ether, manufactured by Kao Corporation) in hexane (concentration of EMULGEN=1.0 g/L) were added. By stirring the mixture at the temperature for two hours, preliminarily polymerized catalyst (XPV-16) in which EMULGEN was supported on the preliminarily polymerized catalyst (XP-16) was obtained.

[Polymerization]

Using a continuous fluidized bed gaseous phase polymerization equipment, ethylene and 1-hexene were copolymerized at a total pressure of 2.0 MPa-G, at a polymerization temperature of 70° C. and a linear gas velocity of 0.8 m/sec. The preliminarily polymerized catalyst (XPV-16) prepared above was dried and fed continuously at a rate of a range of 25 to 30 g/hr, while ethylene, 1-hexene, hydrogen and nitrogen were continuously fed so that the gas composition was kept constant during the polymerization (gas composition: 1-hexene/ethylene=1.1 to $1.3 \times 10^{-2}$, ethylene concentration=71.4%). The yield of the resulting ethylene-based polymer was 5.3 kg/hr.

Using the resulting ethylene-based polymer, a measurement sample was prepared in the same manner as in Example 1. Using this sample, physical property measurement and extrusion lamination molding were conducted. The results are shown in Tables 9 and 10.

Comparative Example 3 fails to satisfy the requirement with respect to MT/$\eta$* provided in claim 1. For this reason, the neck-in occurring during the molding is greater than those in Examples. Further, it fails to satisfy the requirement of claim 1 with respect to the relationship between the zero shear viscosity ($\eta_0$) and the weight average molecular weight (Mw). For this reason, unlike Examples, take-off surging occurs.

COMPARATIVE EXAMPLE 4

[Preparation of Solid Catalyst Component (X-17)]

100 ml of toluene was introduced into a 200-ml glass flask flushed with nitrogen, and then the slurry of the solid component (S-3) in toluene (2.0 g in terms of solid portion) prepared above was charged under stirring. Then, 32.1 mL of solution of $Me_2Si(Ind)_2ZrCl_2$ (component A) in toluene (0.0015 mmol/ml in terms of Zr atom) was added dropwise, and the mixture was reacted at room temperature for one hour. Thereafter, the supernatant was removed by decantation, and the remaining solids were washed twice with decane and converted into 100 ml decane slurry [solid catalyst component (X-17)]. A part of the resulting slurry of the solid catalyst component (X-17) in decane was collected to examine its concentration. The result indicated that the Zr concentration was 0.043 mg/ml, and the Al concentration was 2.49 mg/ml.

[Polymerization]

500 ml of purified heptane was introduced into an SUS autoclave having an internal volume of 1 liter purged sufficiently with nitrogen, and the liquid phase and gaseous phase were saturated with ethylene by flowing ethylene. Then, the atmosphere in the system was replaced by a hydrogen-ethylene mixed gas (hydrogen concentration: 0.54 vol %), and then 15 ml of 1-hexene, 0.375 mmol of triisobutylaluminum and 0.5 g of solid catalyst component (X-17) were introduced thereinto in this order. The mixture was heated to 80° C. and polymerized for 90 minutes at a pressure of 0.78 MPa-G. The resulting polymer was vacuum-dried for 10 hours to give 86.7 g of ethylene-based polymer.

Using the resulting ethylene-based polymer, a measurement sample was prepared in the same manner as in Example 10. The results of the physical property measurement using this sample are shown in Table 9.

COMPARATIVE EXAMPLE 5

Product pellets of ethylene/1-octene copolymer (trade name: Affinity PF1140) produced by solution polymerization, commercially available from Dow Chemical Company, were used to prepare a measurement sample to evaluate its physical properties. The results are shown in Table 9.

Comparative Examples 4 and 5 fail to satisfy the requirement with respect to MT/$\eta$* provided in claim 1. For this reason, it is assumed that the neck-in is greater than those of Examples. Further, it fails to satisfy the requirement of claim 1 with respect to the relationship between the zero shear viscosity ($\eta_0$) and the weight average molecular weight (Mw). For this reason, unlike Examples, it is assumed that take-off surging will occur.

TABLE 1

| | | Example No. | | | | | | | | |
|---|---|---|---|---|---|---|---|---|---|---|
| | | 1 | 2 | 3 | 4 | 5 | 6 | 7 | 8 | 9 |
| Solid catalyst[Note 1] | | XP-1 | XP-1 | XP-1 | XP-1 | XP-2 | XP-2 | XP-2 | XP-2 | XP-2 |
| Component (A)[Note 1] | | A-1 | A-1 | A-1 | A-1 | A-1 | A-1 | A-1 | A-1 | A-1 |
| Component (B)[Note 1] | | B-1 | B-1 | B-1 | B-1 | B-1 | B-1 | B-1 | B-1 | B-1 |
| Component (A)/Component (B) | Molar ratio | 95/5 | 95/5 | 95/5 | 95/5 | 85/15 | 85/15 | 85/15 | 85/15 | 85/15 |

TABLE 1-continued

|  |  |  | \multicolumn{9}{c}{Example No.} |
|---|---|---|---|---|---|---|---|---|---|---|---|
|  |  |  | 1 | 2 | 3 | 4 | 5 | 6 | 7 | 8 | 9 |
| Polymerization condition | Amount of catalyst | mmol/h | 0.44 | 0.32 | 0.32 | 0.29 | 0.36 | 0.26 | 0.13 | 0.14 | 0.1 |
|  | Ethylene | kg/h | 6.6 | 8 | 8 | 8 | 8 | 5 | 5 | 5 | 5 |
|  | TIBAL | mmol/h | 20 | 20 | 20 | 20 | 20 | 20 | 20 | 20 | 20 |
|  | 1-Hexene | g/h | 500 | 650 | 700 | 1100 | 650 | 450 | 900 | 450 | 1900 |
|  | Polymerization temperature | °C. | 80 | 80 | 80 | 80 | 80 | 80 | 80 | 80 | 65 |
|  | Polymerization pressure | MPa-G | 0.8 | 0.8 | 0.8 | 0.8 | 0.8 | 0.8 | 1 | 1 | 1 |
|  | Residence time | hr | 2.6 | 2.5 | 2.5 | 2.5 | 2.5 | 2.7 | 2.7 | 2.7 | 2.7 |
|  | Gas phase H/E | m.r. | — | — | — | — | 0.0065 | 0.02 | 0.008 | 0.002 | 0.015 |
| Polymer yield |  | kg/hr | 4.4 | 5.9 | 5.6 | 6.2 | 5.5 | 3.1 | 3 | 3.3 | 3.1 |

Note 1) An abbreviation same as that recited in Example is used.

TABLE 2

|  |  |  | \multicolumn{7}{c}{Example No.} |
|---|---|---|---|---|---|---|---|---|---|
|  |  |  | 10 | 11 | 12 | 13 | 14 | 15 | 16 |
| Solid catalyst[Note 1] |  |  | X-3 | X-4 | X-5 | X-5 | X-5 | X-6 | X-6 |
| Component (A)[Note 1] |  |  | A-1 | A-1 | A-1 | A-1 | A-1 | A-1 | A-1 |
| Component (B)[Note 1] |  |  | B-1 | B-1 | B-1 | B-1 | B-1 | B-1 | B-1 |
| Component (A)/Component (B) |  | Molar ratio | 80/20 | 95/5 | 96/4 | 96/4 | 96/4 | 88/12 | 88/12 |
| Polymerization condition | Amount of catalyst | mmol | 0.01 | 0.0025 | 0.0025 | 0.0025 | 0.0025 | 0.0025 | 0.0025 |
|  | $H_2$ concentration | vol % | 0.45 | 0.2 | 0.1 | 0.2 | 0.25 | 0.75 | 0.83 |
|  | 1-Hexene | ml | 10 | 10 | 10 | 10 | 10 | 10 | 10 |
|  | Polymerization temperature | °C. | 80 | 80 | 80 | 80 | 80 | 80 | 80 |
|  | Polymerization pressure | MPa-G | 0.78 | 0.78 | 0.78 | 0.78 | 0.78 | 0.78 | 0.78 |
|  | Polymerization time | min | 90 | 90 | 90 | 90 | 90 | 90 | 90 |
| Polymer yield |  | g | 87.4 | 71.4 | 46.2 | 52.2 | 58.6 | 71.3 | 65.9 |

Note 1) An abbreviation same as that recited in Example is used.

TABLE 3

|  |  |  | \multicolumn{8}{c}{Example No.} |
|---|---|---|---|---|---|---|---|---|---|---|
|  |  |  | 17 | 18 | 19 | 20 | 21 | 22 | 23 | 24 |
| Solid catalyst[Note 1] |  |  | X-7 | X-8 | X-7 | XP-4 | XP-9 | XP-10 | XP-10 | XP-11/XP-12 |
| Component (A)[Note 1] |  |  | A-1 | A-1 | A-1 | A-1 | A-1 | A-1 | A-1 | A-1 |
| Component (B)[Note 1] |  |  | B-1 | B-1 | B-1 | B-1 | B-1 | B-1 | B-1 | B-1 |
| Component (A)/Component (B) |  | Molar ratio | 92/8 | 90/10 | 92/8 | 95/5 | 80/20 | 70/30 | 70/30 | 90/10 |
| Polymerization condition | Amount of catalyst | mmol | 0.0026 | 0.0026 | 0.0031 | 0.0026 | 0.0012 | 0.002 | 0.002 | 0.0028 |
|  | $H_2$ concentration | vol % | 0.65 | 0.064 | 0.064 | 0 | 0 | 0 | 0 | 0.2 |
|  | 1-Hexene | ml | 3 | 30 | 30 | 30 | 50 | 50 | 40 | 3 |
|  | Polymerization temperature | °C. | 80 | 70 | 70 | 70 | 50 | 50 | 50 | 80 |
|  | Polymerization pressure | MPa-G | 0.78 | 0.78 | 0.78 | 0.78 | 0.78 | 0.78 | 0.78 | 0.78 |
|  | Polymerization time | min | 90 | 90 | 90 | 90 | 90 | 90 | 90 | 90 |
| Polymer yield |  | g | 63.9 | 92.9 | 44.5 | 60.8 | 25.6 | 56.6 | 50.3 | 55.3 |

Note 1) An abbreviation same as that recited in Example is used.

TABLE 4

|  |  |  | Example No. | | | | | | |
| --- | --- | --- | --- | --- | --- | --- | --- | --- | --- |
|  |  |  | 25 | 26 | 27 | 28 | 29 | 30 | 31 |
| Solid catalyst[Note 1] |  |  | XP-11/XP-12 | XP-11/XP-12 | XP-11/XP-12 | XP-11/XP-12 | X-13 | X-14 | X-15 |
| Component (A)[Note 1] |  |  | A-1 | A-1 | A-1 | A-1 | A-1 | A-2 | A-3 |
| Component (B)[Note 1] |  |  | B-1 | B-1 | B-1 | B-1 | B-2 | B-1 | B-1 |
| Component (A)/Component (B) |  | Molar ratio | 90/10 | 90/10 | 90/10 | 95/5 | 90/10 | 20/80 | 20/80 |
| Polymerization condition | Amount of catalyst | mmol | 0.0028 | 0.0028 | 0.0028 | 0.0025 | 0.003 | 0.0005 | 0.001 |
|  | $H_2$ concentration | vol % | 0 | 0.2 | 0.31 | 0 | 0.31 | 0 | 0.02 |
|  | 1-Hexene | ml | 30 | 30 | 30 | 30 | 10 | 30 | 10 |
|  | Polymerization temperature | °C. | 70 | 70 | 70 | 70 | 80 | 70 | 80 |
|  | Polymerization pressure | MPa-G | 0.78 | 0.78 | 0.78 | 0.78 | 0.78 | 0.78 | 0.78 |
|  | Polymerization time | min | 90 | 90 | 90 | 90 | 90 | 90 | 90 |
| Polymer yield |  | g | 76.8 | 62.8 | 72.3 | 60.9 | 38.4 | 72 | 67.7 |

[Note 1] An abbreviation same as that recited in Example is used.

TABLE 5

|  |  | Example 1 | Example 2 | Example 3 | Example 4 | Example 5 | Example 6 | Example 7 | Example 8 | Example 9 |
| --- | --- | --- | --- | --- | --- | --- | --- | --- | --- | --- |
| Comonomer |  | 1-Hexene | 1-Hexene | 1-Hexene | 1-Hexene | 1-Hexene | 1-Hexene | 1-Hexene | 1-Hexene | 1-Hexene |
| MFR | g/10 min | 24.7 | 33.0 | 32.0 | 31.0 | 12.2 | 27.4 | 10.7 | 5.1 | 11.5 |
| Density | kg/m³ | 947 | 943 | 941 | 937 | 941 | 946 | 937 | 942 | 920 |
| [η] | dl/g | 1.09 | 1.01 | 0.98 | 0.95 | 1.10 | 0.82 | 1.08 | 1.45 | 1.09 |
| MT | g | 1.07 | 0.99 | 1.00 | 0.98 | 2.21 | 0.86 | 2.47 | 4.24 | 2.52 |
| η* | P | 3,760 | 2,360 | 2,500 | 3,150 | 9,700 | 4,340 | 11,830 | 23,300 | 11,200 |
| (MT/η*) × 10⁴ | g/P | 2.84 | 4.19 | 4.02 | 3.11 | 2.28 | 1.98 | 2.08 | 1.82 | 2.25 |
| A + B[Note 1] | /1000 C. | 0.6 | 0.6 | 0.7 | 0.4 | 0.5 | 0.5 | 0.6 | 0.6 | 0.4 |
| $\eta_0$ | P | 5,200 | 3,110 | 3,240 | 3,900 | 19,100 | 5,880 | 28,800 | 64,100 | 24,300 |
| GPC Mn |  | 15,000 | 13,500 | 13,200 | 12,500 | 11,200 | 8,770 | 11,400 | 16,800 | 11,300 |
| Mw |  | 124,000 | 119,000 | 117,000 | 110,000 | 140,000 | 91,300 | 142,000 | 173,000 | 141,000 |
| Mz |  | 1,130,000 | 1,410,000 | 1,190,000 | 1,060,000 | 1,240,000 | 738,000 | 1,280,000 | 1,430,000 | 1,250,000 |
| Mw/Mn |  | 8.29 | 8.83 | 8.87 | 8.81 | 12.50 | 10.41 | 12.49 | 10.31 | 12.48 |
| Mz/Mw |  | 9.09 | 11.83 | 10.18 | 9.61 | 8.86 | 8.09 | 8.99 | 8.27 | 8.87 |
| (Note 2) |  | 93,500 | 81,300 | 76,700 | 62,200 | 141,300 | 33,000 | 148,200 | 290,100 | 144,700 |
| (Note 3) |  | 210 | 180 | 170 | 140 | 310 | 70 | 330 | 640 | 320 |

(Note 1) Sum of Me branches and Et branches. Detection lower limit (0.02/1000 C.).
(Note 2) Value of $4.5 \times 10^{-13} \times Mw^{3.4}$
(Note 3) Value of $0.01 \times 10^{-13} \times Mw^{3.4}$

TABLE 6

|  |  | Example 10 | Example 11 | Example 12 | Example 13 | Example 14 | Example 15 | Example 16 |
| --- | --- | --- | --- | --- | --- | --- | --- | --- |
| Comonomer |  | 1-Hexene | 1-Hexene | 1-Hexene | 1-Hexene | 1-Hexene | 1-Hexene | 1-Hexene |
| MFR | g/10 min | 26.3 | 1.8 | 4.8 | 11.5 | 19.1 | 10.9 | 16.6 |
| Density | kg/m³ | 949 | 940 | 941 | 941 | 944 | 940 | 941 |
| [η] | dl/g | 0.91 | 1.36 | 1.27 | 1.12 | 1.01 | 1.07 | 0.99 |
| MT | g | 1.80 | 14.50 | 9.10 | 5.15 | 3.10 | 2.42 | 1.69 |
| η* | P | 6,290 | 43,160 | 20,100 | 11,040 | 7,100 | 10,920 | 8,270 |
| (MT/η*) × 10⁴ | g/P | 2.86 | 3.36 | 4.53 | 4.67 | 4.36 | 2.22 | 2.04 |
| A + B[Note 1] | /1000 C. | 0.4 | 0.3 | 0.5 | 0.4 | 0.4 | 0.4 | 0.3 |
| $\eta_0$ | P | 11,100 | 221,000 | 65,800 | 25,300 | 12,400 | 19,300 | 13,700 |
| GPC Mn |  | 4,070 | 8,230 | 7,680 | 6,040 | 6,640 | 5,760 | 5,600 |
| Mw |  | 79,300 | 211,000 | 184,000 | 154,000 | 136,000 | 91,400 | 84,600 |
| Mz |  | 833,000 | 1,600,000 | 1,580,000 | 1,410,000 | 1,330,000 | 822,000 | 801,000 |
| Mw/Mn |  | 19.46 | 25.58 | 23.93 | 25.50 | 20.41 | 15.87 | 15.11 |

TABLE 6-continued

|  | Example 10 | Example 11 | Example 12 | Example 13 | Example 14 | Example 15 | Example 16 |
|---|---|---|---|---|---|---|---|
| Mz/Mw | 10.50 | 7.60 | 8.61 | 9.19 | 9.82 | 8.99 | 9.47 |
| (Note 2) | 20,500 | 569,900 | 357,800 | 195,300 | 128,000 | 33,100 | 25,500 |
| (Note 3) | 50 | 1270 | 800 | 430 | 280 | 70 | 60 |

*1 Sum of Me branches and Et branches. Detection lower limit (0.02/1000 C.).
*2 Value of $4.5 \times 10^{-13} \times Mw^{3.4}$
*3 Value of $0.01 \times 10^{-13} \times Mw^{3.4}$

TABLE 7

|  |  | Example 17 | Example 18 | Example 19 | Example 20 | Example 21 | Example 22 | Example 23 | Example 24 |
|---|---|---|---|---|---|---|---|---|---|
| Comonomer |  | 1-Hexene | 1-Hexene | 1-Hexene | 1-Hexene | 1-Hexene | 1-Hexene | 1-Hexene | 1-Hexene |
| MFR | g/10 min | 28.5 | 2.9 | 12.8 | 17.3 | 36.0 | 6.3 | 2.5 | 1.9 |
| Density | kg/m³ | 958 | 920 | 917 | 922 | 891 | 886 | 899 | 959 |
| [η] | dl/g | 0.93 | 1.24 | 1.10 | 1.04 | 0.88 | 1.14 | 1.35 | 1.41 |
| MT | g | 0.93 | 11.20 | 4.46 | 3.38 | 1.11 | 4.00 | 7.20 | 8.60 |
| η* | P | 4,800 | 26,860 | 7,360 | 6,080 | 2,670 | 12,100 | 24,320 | 48,000 |
| (MT/η*) × 10⁴ | g/P | 1.93 | 4.17 | 6.06 | 5.56 | 4.15 | 3.31 | 2.96 | 1.79 |
| A + B (Note 1) | /1000 C. | 0.4 | 0.4 | 0.5 | 0.4 | 0.8 | 0.5 | 0.3 | 0.5 |
| η₀ | P | 7,010 | 189,000 | 24,100 | 11,400 | 3,650 | 19,000 | 68,000 | 237,000 |
| GPC Mn |  | 5,800 | 11,300 | 10,300 | 11,800 | 12,000 | 18,000 | 21,600 | 10,400 |
| Mw |  | 96,600 | 156,000 | 112,000 | 120,000 | 66,900 | 93,000 | 115,000 | 166,000 |
| Mz |  | 929,000 | 1,270,000 | 1,320,000 | 1,120,000 | 331,000 | 310,000 | 350,000 | 1,250,000 |
| Mw/Mn |  | 16.66 | 13.82 | 10.94 | 10.22 | 5.58 | 5.17 | 5.32 | 15.93 |
| Mz/Mw |  | 9.62 | 8.12 | 11.75 | 9.32 | 4.95 | 3.30 | 3.04 | 7.55 |
| (Note 2) |  | 40,000 | 204,100 | 66,200 | 83,600 | 11,500 | 35,200 | 72,400 | 252,100 |
| (Note 3) |  | 90 | 450 | 150 | 190 | 30 | 80 | 160 | 560 |

*1 Sum of Me branches and Et branches. Detection lower limit (0.02/1000 C.).
*2 Value of $4.5 \times 10^{-13} \times Mw^{3.4}$
*3 Value of $0.01 \times 10^{-13} \times Mw^{3.4}$

TABLE 8

|  |  | Example 25 | Example 26 | Example 27 | Example 28 | Example 29 | Example 30 | Example 31 |
|---|---|---|---|---|---|---|---|---|
| Comonomer |  | 1-Hexene | 1-Hexene | 1-Hexene | 1-Hexene | 1-Hexene | 1-Hexene | 1-Hexene |
| MFR | g/10 min | 3.2 | 10.2 | 18.0 | 10.0 | 22.8 | 18.1 | 11.8 |
| Density | kg/m³ | 916 | 913 | 916 | 919 | 947 | 913 | 962 |
| [η] | dl/g | 1.27 | 1.05 | 1.01 | 1.07 | 0.99 | 1.07 | 1.26 |
| MT | g | 9.30 | 2.88 | 1.33 | 3.84 | 1.96 | 1.33 | 2.70 |
| η* | P | 26,940 | 9,970 | 5,860 | 9,850 | 6,190 | 5,480 | 16,000 |
| (MT/η*) × 10⁴ | g/P | 3.45 | 2.88 | 2.27 | 3.90 | 3.17 | 2.43 | 1.69 |
| A + B (Note 1) | /1000 C. | 0.4 | 0.3 | 0.3 | 0.4 | 0.4 | 0.3 | 0.5 |
| η₀ | P | 109,000 | 17,600 | 8,690 | 18,900 | 10,500 | 8,560 | 50,400 |
| GPC Mn |  | 12,000 | 11,500 | 9,800 | 11,300 | 5,500 | 21,200 | 4,410 |
| Mw |  | 146,000 | 108,000 | 93,000 | 132,000 | 69,800 | 84,900 | 203,000 |
| Mz |  | 1,090,000 | 723,000 | 724,000 | 1,020,000 | 645,000 | 618,000 | 1,250,000 |
| Mw/Mn |  | 12.16 | 9.42 | 9.49 | 11.64 | 12.69 | 4.00 | 46.03 |
| Mz/Mw |  | 7.49 | 6.70 | 7.79 | 7.76 | 9.24 | 7.28 | 6.14 |
| (Note 2) |  | 162,900 | 58,500 | 35,200 | 115,700 | 13,300 | 25,800 | 499,700 |
| (Note 3) |  | 360 | 130 | 80 | 260 | 30 | 60 | 1110 |

*1 Sum of Me branches and Et branches. Detection lower limit (0.02/1000 C.).
*2 Value of $4.5 \times 10^{-13} \times Mw^{3.4}$
*3 Value of $0.01 \times 10^{-13} \times Mw^{3.4}$

TABLE 9

|  |  | Comparative Example 1 | Comparative Example 2 | Comparative Example 3 | Comparative Example 4 | Comparative Example 5 |
|---|---|---|---|---|---|---|
| Comonomer |  | 4-Methyl-1-pentene | — | 1-Hexene | 1-Hexene | 1-Octene |
| MFR | g/10 min | 8.7 | 7.1 | 13.3 | 7.1 | 1.7 |
| Density | kg/m³ | 918 | 918 | 913 | 931 | 899 |

TABLE 9-continued

|  |  | Comparative Example 1 | Comparative Example 2 | Comparative Example 3 | Comparative Example 4 | Comparative Example 5 |
|---|---|---|---|---|---|---|
| [η] | dl/g | 1.35 | 1.14 | 1.00 | 1.18 | 1.53 |
| MT | g | 0.23 | 3.60 | 1.00 | 1.60 | 1.96 |
| η* | P | 8,280 | 13,200 | 7,400 | 20,800 | 44,700 |
| (MT/η*) × $10^4$ | g/P | 0.28 | 2.73 | 1.35 | 0.77 | 0.44 |
| A+ B(Note 1) | /1000 C. | * | 9.4 | * | * | * |
| $\eta_0$ | P | 8,620 | 19,600 | 10,700 | 46,000 | 68,200 |
| GPC Mn |  | 19,000 | 16,000 | 7,600 | 9,000 | 28,700 |
| Mw |  | 64,000 | 470,000 | 64,000 | 91,500 | 85,300 |
| Mz |  | 146,000 | 3,700,000 | 280,000 | 652,000 | 164,000 |
| Mw/Mn |  | 3.37 | 29.38 | 8.42 | 10.17 | 2.97 |
| Mz/Mw |  | 2.28 | 7.87 | 4.38 | 7.13 | 1.92 |
| (Note 2) |  | 9,900 | 8,676,500 | 9,900 | 33,300 | 26,200 |
| (Note 3) |  | 20 | 19300 | 20 | 70 | 60 |

(Note 1) Sum of Me branches and Et branches.
* indicates to be the detection lower limit (0.02/1000 C.) or less.
*2 Value of $4.5 \times 10^{-13} \times Mw^{3.4}$
*3 Value of $0.01 \times 10^{-13} \times Mw^{3.4}$

TABLE 10

|  |  | Example 1 | Example 2 | Example 3 | Example 4 | Example 5 | Example 7 | Example 8 | Example 9 | Compartive Example 1 | Compartive Example 2 | Compartive Example 3 |
|---|---|---|---|---|---|---|---|---|---|---|---|---|
| Neck-in |  |  |  |  |  |  |  |  |  |  |  |  |
| Take-off rate: 80 m/min | mm | 67 | 68 | 68 | 75 | 57 | 57 | 59 | 54 | 185 | 40 | 106 |
| Take-off rate: 120 m/min | mm | 59 | 60 | 59 | 64 |  | 52 |  |  | * |  | * |
| Take-off rate: 200 m/min | mm | 55 | 54 | 53 | 58 |  |  |  |  | * |  | * |
| Take-off surging occurrence speed | m/min | Not occurred | Not occurred | Not occurred | Not occurred | Not occurred | Not occurred | Not occurred | Not occurred | 30 | Not occurred | 50 |
| Film tear speed | m/min | 200 | 220 | 210 | 250 | 100 | 120 | 80 | 100 | >350 | 110 | 240 |
| Resin pressure | MPa | 2.0 | 2.0 | 2.0 | 2.1 | 4.3 | 3.0 | 7.7 | 3.4 | 10.8 | 5.9 | 5.1 |
| Heat seal strength |  |  |  |  |  |  |  |  |  |  |  |  |
| 120° C. | N/15 mm width | 1.5 | 0.4 | 0.9 | 7.7 | 0.5 | 2.2 | 0.3 | 43.5 | 20.8 | 30.8 | 36.8 |
| 130° C. | N/15 mm width | 12.8 | 11.3 | 11.1 | 25.5 | 11.3 | 17.5 | 10.5 | 44.8 | 47.5 | 32.8 | 46.2 |
| 140° C. | N/15 mm width | 29.0 | 28.0 | 29.5 | 39.8 | 31.2 | 40.3 | 42.8 | 44.1 | 48.9 | 34.7 | 48.8 |
| 150° C. | N/15 mm width | 40.5 | 39.2 | 38.0 | 40.4 | 41.4 | 40.9 | 46.8 | 44.6 | 49.5 | 33.6 | 49.7 |
| 160° C. | N/15 mm width | 41.1 | 40.2 | 40.8 | 41.0 | 42.3 | 41.6 | 47.2 | 43.8 | 50.5 | 34.8 | 49.9 |

* Measurement could not be done due to occurrence of serious take-off surging.

EXAMPLE 32

[Ethylene-Based Polymer [R1-1]]

Ethylene-based polymer [R1-1] was produced by a method same as in Example 1. Using the resulting ethylene-based polymer [R1-1], a measurement sample was prepared in the same manner as in Example 10. The results of the physical property measurement using this sample are shown in Table 11.

[Ethylene-Based Polymer [R2-1]]

An ethylene/4-methyl-1-pentene copolymer commercially available from Prime Polymer Co., Ltd. (commercial name: ULTZEX UZ15150J) was used as the ethylene-based polymer [R2]. The results of the physical property measurement using the product pellets as a measurement sample are shown in Table 11.

[Ethylene-Based Resin]

An ethylene-based resin was prepared by dry blending ethylene-based polymer [R1-1] and ethylene-based polymer [R2-1] in a weight ratio: [R1-1]/[R2-1]=30/70, and melt kneading the mixture at a resin temperature of 180° C. at a revolution number of 50 rpm for 5 minutes in a Laboplast mill manufactured by Toyo Seiki Seisaku-sho, Ltd. This melted polymer was cooled under the conditions of a cooling temperature of 20° C., a cooling time of 5 minutes and a cooling pressure of 100 kg/cm² with a press-molding machine manufactured by Shinto Metal Industries, Ltd. The results of the physical property measurement using this sample are shown in Table 12.

TABLE 11

|  |  | Ethylene-based polymer [R1] | Ethylene-based polymer [R2] |
|---|---|---|---|
| Code No. |  | [R1-1] | [R2-1] |
| Comonomer |  | 1-Hexene | 4-Methyl-1-pentene |
| MFR | g/10 min. | 1.8 | 15.4 |
| Density | kg/m³ | 940 | 915 |
| [η] | dl/g | 1.36 | 1.05 |
| MT | g | 14.50 | 0.20 |
| η* | P | 43160 | 5700 |
| (MT/η*) × 10⁴ | g/P | 3.36 | 0.35 |
| Sum of Me branches and Et branches: A + B | /1000 C. | 0.3 | (Note 1) |
| η₀ | P | 221000 | 5720 |
| GPC Mn |  | 8230 | 16000 |
| Mw |  | 211000 | 41000 |
| Mz |  | 1600000 | 89000 |
| Mw/Mn |  | 25.58 | 2.50 |
| Mz/Mw |  | 7.60 | 2.15 |
| (Note 2) |  | 569900 | 2200 |
| (Note 3) |  | 1270 | 5 |

(Note 1) Detection lower limit (0.02/1000 C.) or less
(Note 2) Value of $4.5 \times 10^{-13} \times Mw^{3.4}$
(Note 3) Value of $0.01 \times 10^{-13} \times Mw^{3.4}$

TABLE 12

|  |  | Example 32 |
|---|---|---|
| Ethylene-based polymer [R1] Code No. |  | [R1-1] |
| Ethylene-based polymer [R2] Code No. |  | [R2-1] |
| Weight ratio [R1]/[R2] |  | 30/70 |
| MFR | g/10 min | 9.6 |
| Density | kg/m³ | 923 |
| [η] | dl/g | 1.17 |
| MT | g | 2.25 |
| η* | P | 9310 |
| (MT/η*) × 10⁴ | g/P | 2.42 |
| Sum of Me branches and Et branches: A + B | /1000 C. | 0.1 |
| η₀ | P | 13300 |
| GPC Mn |  | 11500 |
| Mw |  | 89800 |
| Mz |  | 1140000 |
| Mw/Mn |  | 7.81 |
| Mz/Mw |  | 12.74 |
| (Note 2) |  | 31200 |
| (Note 2) |  | 70 |

(Note 2) Value of $4.5 \times 10^{-13} \times Mw^{3.4}$
(Note 3) Value of $0.01 \times 10^{-13} \times Mw^{3.4}$

INDUSTRIAL APPLICABILITY

The ethylene-based resin of the present invention has characteristic of a melt tension sufficiently greater than the existing ethylene-based resins produced by use of a Ziegler Natta catalyst or a metallocene catalyst and is excellent in mechanical strength as a molded object. Therefore, the ethylene-based resin of the present invention is expected to perform a great industrial contribution in fields where plastic molded objects having sufficient mechanical strength and uniform quality are required in a sufficient yield.

The invention claimed is:

1. An ethylene-based resin satisfying the following requirements [1] to [6] simultaneously:
   [1] melt flow rate (MFR) under a loading of 2.16 kg at 190° C. is in the range of 0.1 to 100 g/10 minutes;
   [2] density (d) is in the range of 875 to 970 kg/m³;
   [3] ratio [MT/η*(g/P)] of melt tension [MT (g)] at 190° C. to shear viscosity [η*(P)] at 200° C. at an angular velocity of 1.0 rad/sec. is in the range of $1.50 \times 10^{-4}$ to $9.00 \times 10^{-4}$;
   [4] sum [(A+B)(/1000 C)] of the number of methyl branches [A(/1000 C)] and the number of ethyl branches [B(/1000 C)] per 1000 carbon atoms measured by $^{13}$C-NMR is 1.8 or less;
   [5] zero shear viscosity [η₀(P)] at 200° C. and weight-average molecular weight (Mw) measured by GPC-viscosity detector method (GPC-VISCO) satisfy the following relational expression (Eq-1):

$$0.01 \times 10^{-13} \times Mw^{3.4} \leq \eta_0 \leq 4.5 \times 10^{-13} \times Mw^{3.4} \quad \text{(Eq-1); and}$$

[6] intrinsic viscosity ([η] (dl/g)) measured in decalin at 135° C. and the weight average molecular weight Mw measured by GPC-viscosity detector method (GPC-VISCO) satisfy the following relational expression (Eq-7):

$$0.80 \times 10^{-4} \times Mw^{0.776} \leq [\eta] \leq 1.65 \times 10^{-4} \times Mw^{0.776} \quad \text{(Eq-7).}$$

2. The ethylene-based resin according to claim 1 which is a copolymer of ethylene and an α-olefin having 4 to 10 carbon atoms.

3. A molded object obtained from the ethylene-based resin according to claim 1 or 2.

4. The molded object according to claim 3, wherein the molded object is a film.

* * * * *